(12) United States Patent
Ishibashi et al.

(10) Patent No.: US 10,927,525 B2
(45) Date of Patent: Feb. 23, 2021

(54) CONTROL SYSTEM FOR WORK VEHICLE, CONTROL METHOD, AND WORK VEHICLE

(71) Applicant: KOMATSU LTD., Tokyo (JP)

(72) Inventors: Eiji Ishibashi, Tokyo (JP); Akifumi Inamaru, Tokyo (JP); Yasuhito Yonezawa, Tokyo (JP); Takahiro Shimojo, Tokyo (JP)

(73) Assignee: KOMATSU LTD., Tokyo (JP)

( * ) Notice: Subject to any disclaimer, the term of this patent is extended or adjusted under 35 U.S.C. 154(b) by 256 days.

(21) Appl. No.: 16/083,221

(22) PCT Filed: Jul. 25, 2017

(86) PCT No.: PCT/JP2017/026913
§ 371 (c)(1),
(2) Date: Sep. 7, 2018

(87) PCT Pub. No.: WO2018/021340
PCT Pub. Date: Feb. 1, 2018

(65) Prior Publication Data
US 2019/0093315 A1 Mar. 28, 2019

(30) Foreign Application Priority Data
Jul. 26, 2016 (JP) .............................. JP2016-146381

(51) Int. Cl.
*E02F 9/20* (2006.01)
*G06T 7/529* (2017.01)

(52) U.S. Cl.
CPC .............. *E02F 9/2029* (2013.01); *E02F 9/20* (2013.01); *E02F 9/2033* (2013.01); *G06T 7/529* (2017.01); *G06T 2207/30181* (2013.01)

(58) Field of Classification Search
CPC ......... E02F 9/2029; E02F 9/20; E02F 9/2033; G06T 7/529; G06T 2207/30181
See application file for complete search history.

(56) References Cited

U.S. PATENT DOCUMENTS

| 4,820,041 A | * | 4/1989 | Davidson | ............... | E02F 3/842 |
| | | | | | 172/4.5 |
| 5,062,087 A | * | 10/1991 | Dydzyk | ................. | G01S 15/86 |
| | | | | | 367/99 |

(Continued)

FOREIGN PATENT DOCUMENTS

| CN | 103080433 A | 5/2013 |
| CN | 103646422 A | 3/2014 |

(Continued)

OTHER PUBLICATIONS

The Office Action for the corresponding Japanese application No. 2016-146381, dated Nov. 5, 2019.

(Continued)

*Primary Examiner* — Calvin Cheung
(74) *Attorney, Agent, or Firm* — Global IP Counselors, LLP

(57) ABSTRACT

A work vehicle control system includes an actual topography acquisition device, a storage device, and a controller. The actual topography acquisition device acquires actual topography information, which indicates the actual topography of a work target. The storage device stores design topography information, which indicates a final design topography that is a target topography of the work target. The controller acquires the actual topography information from the actual topography acquisition device. The controller acquires the design topography information from the storage device. The controller generates a command signal to move the work implement to a position that is between the actual topography and the final design topography, and a predetermined distance above the actual topography.

20 Claims, 20 Drawing Sheets

(56) References Cited

U.S. PATENT DOCUMENTS

| | | | |
|---|---|---|---|
| 5,875,854 A | 3/1999 | Yamamoto et al. | |
| 5,984,018 A | 11/1999 | Yamamoto et al. | |
| 6,047,227 A * | 4/2000 | Henderson | E02F 9/2045 172/4.5 |
| 6,064,940 A * | 5/2000 | Rodgers | G01C 15/02 342/450 |
| 6,181,999 B1 | 1/2001 | Yamamoto et al. | |
| 6,919,865 B2 * | 7/2005 | Tamaru | E01C 19/00 340/463 |
| 7,532,967 B2 * | 5/2009 | Fujishima | E02F 9/2045 37/341 |
| 2003/0006048 A1 * | 1/2003 | Marriott, Jr. | E02F 3/842 172/4.5 |
| 2004/0044543 A1 * | 3/2004 | Rowden | G06Q 10/087 705/300 |
| 2005/0104884 A1 * | 5/2005 | Iwata | G09B 29/005 345/440 |
| 2006/0161324 A1 | 7/2006 | Ozawa et al. | |
| 2009/0071667 A1 | 3/2009 | Cox et al. | |
| 2010/0198516 A1 * | 8/2010 | Scott | G01C 21/165 702/5 |
| 2010/0211512 A1 * | 8/2010 | Detwiler | G06Q 10/04 705/315 |
| 2010/0280862 A1 * | 11/2010 | Bryant | B42F 1/00 705/7.28 |
| 2012/0059554 A1 | 3/2012 | Omelchenko et al. | |
| 2013/0081831 A1 | 4/2013 | Hayashi | |
| 2013/0158785 A1 * | 6/2013 | Fukano | E02F 9/261 701/34.4 |
| 2013/0158786 A1 | 6/2013 | Fukano et al. | |
| 2013/0158787 A1 * | 6/2013 | Nomura | E02F 9/264 701/34.4 |
| 2013/0311031 A1 | 11/2013 | Friend et al. | |
| 2014/0088838 A1 * | 3/2014 | Furem | G01G 19/14 701/50 |
| 2014/0100744 A1 * | 4/2014 | Johnson | G01S 19/48 701/50 |
| 2015/0103287 A1 * | 4/2015 | Saitou | E02F 9/0858 349/58 |
| 2016/0057921 A1 * | 3/2016 | Pickett | G05D 1/021 701/41 |
| 2016/0076223 A1 | 3/2016 | Wei et al. | |
| 2016/0077513 A1 | 3/2016 | Wei et al. | |
| 2016/0077514 A1 | 3/2016 | Taylor et al. | |
| 2016/0193920 A1 | 7/2016 | Tsubone et al. | |

FOREIGN PATENT DOCUMENTS

| | | |
|---|---|---|
| CN | 104884713 A | 9/2015 |
| JP | 10-88612 A | 4/1998 |
| JP | 10-147952 A | 6/1998 |
| JP | 10-317418 A | 12/1998 |
| JP | 2000-230253 A | 8/2000 |
| JP | 2001-303620 A | 10/2001 |
| JP | 2003-64725 A | 3/2003 |
| JP | 2003-239287 A | 8/2003 |
| JP | 2005-132266 A | 5/2005 |
| JP | 5247939 B1 | 4/2013 |
| JP | 2013-217137 A | 10/2013 |
| JP | 2016-132912 A | 7/2016 |

OTHER PUBLICATIONS

The Office Action for the corresponding Chinese application No. 201780016926.1 dated Jun. 2, 2020.

The International Search Report for the corresponding international application No. PCT/JP2017/026913, dated Aug. 29, 2017.

* cited by examiner

CONTROL SYSTEM FOR WORK VEHICLE, CONTROL METHOD, AND WORK VEHICLE

CROSS-REFERENCE TO RELATED APPLICATIONS

This application is a U.S. National stage application of International Application No. PCT/JP2017/026913, filed on Jul. 25, 2017. This U.S. National stage application claims priority under 35 U.S.C. § 119(a) to Japanese Patent Application No. 2016-146381, filed in Japan on Jul. 26, 2016, the entire contents of which are hereby incorporated herein by reference.

BACKGROUND

Field of the Invention

The present invention relates to a control system for a work vehicle, a control method, and a work vehicle.

Background Information

An automatic control for automatically adjusting the position of a work implement has been conventionally proposed for work vehicles such as bulldozers or graders and the like. For example, Japanese Patent Publication No. 5247939 discloses excavation control and leveling control.

Under the excavation control, the position of the blade is automatically adjusted such that the load applied to the blade coincides with a target load. Under the leveling control, the position of the blade is automatically adjusted so that the tip of the blade moves along a design topography which represents a target shape of the excavation target.

SUMMARY

Work performed by a work vehicle includes filling work as well as excavating work. During filling work, the work vehicle removes soil from a cutting with the work implement. The work vehicle then piles the removed soil in a predetermined position and compacts the piled soil by traveling over the piled soil. As a result for example, the depressed topography is filled in and a flat shape can be formed.

However, it is difficult to perform desirable filling work under the abovementioned automatic controls. For example as illustrated in FIG. 20, under the leveling control, the position of the blade is automatically adjusted so that the blade tip 200 of the blade moves along the design topography 100. As a result, when the filling work is performed using the leveling control, a large amount of soil is piled at one time in a position in front of the work vehicle 300 as illustrated in FIG. 20 by the dashed line. In this case, it is difficult to compact the piled soil because the thickness of the piled soil is too large. As a result, there is a problem that the quality of the finished work is poor. Alternatively, there is a need for the work vehicle 300 to travel multiple times over the piled soil in order to sufficiently compact the piled soil. In this case, there is a problem that the efficiency of the work is poor.

An object of the present invention is to provide a control system for a work vehicle, a control method, and a work vehicle that enable filling work to be performed that is efficient and exhibits a quality finish using automatic controls.

A control system for a work vehicle according to a first aspect is provided with an actual topography acquisition device, a storage device, and a controller. The actual topography acquisition device acquires actual topography information which indicates an actual topography of a work target. The storage device stores design topography information which indicates a final design topography which is a target topography of the work target. The controller acquires the actual topography information from the actual topography acquisition device. The controller acquires the design topography information from the storage device. The controller generates a command signal for moving the work implement to a position that is between the actual topography and the final design topography and is a predetermined distance above the actual topography.

A control system for a work vehicle according to a second aspect is provided with an actual topography acquisition device, a storage device, and a controller. The actual topography acquisition device acquires actual topography information which indicates the actual topography of a work target. The storage device stores design topography information which indicates a final design topography which is a target topography of the work target. The controller acquires the actual topography information from the actual topography acquisition device. The controller acquires the design topography information from the storage device. The controller determines an intermediate design topography on the basis of the actual topography information and the design topography information. The intermediate design topography is positioned above the actual topography and below the final design topography. The controller generates a command signal for moving the work implement on the basis of the intermediate design topography.

A control method of a work vehicle according to a third aspect includes the following steps. Actual topography information is acquired in a first step. The actual topography information indicates the actual topography of a work target. Design topography information is acquired in a second step. The design topography information indicates a final design topography which is a target topography of a work target. A command signal for moving the work implement to a position that is between the actual topography and the final design topography and is a predetermined distance above the actual topography is generated in a third step.

A work vehicle according to a fourth aspect is provided with a work implement and a controller. The controller acquires actual topography information. The actual topography information indicates the actual topography of a work target. The controller acquires design topography information. The design topography information indicates a final design topography of the work target. The controller controls the work implement so as to move the work implement to a position that is between the actual topography and the final design topography and is a predetermined distance above the actual topography.

According to the present invention, a work implement is automatically controlled so as to move to a position above the actual topography. At this time, the work implement is moved to a position below the final design topography whereby soil can be piled thinly on the actual topography in comparison to a case of moving the work implement along a final design topography. As a result, the piled up soil can be easily compacted by the work vehicle. Accordingly, the quality of the finished work can be improved. Moreover, work efficiency can be improved.

DETAILED DESCRIPTION OF EMBODIMENT(S)

Figure 1:
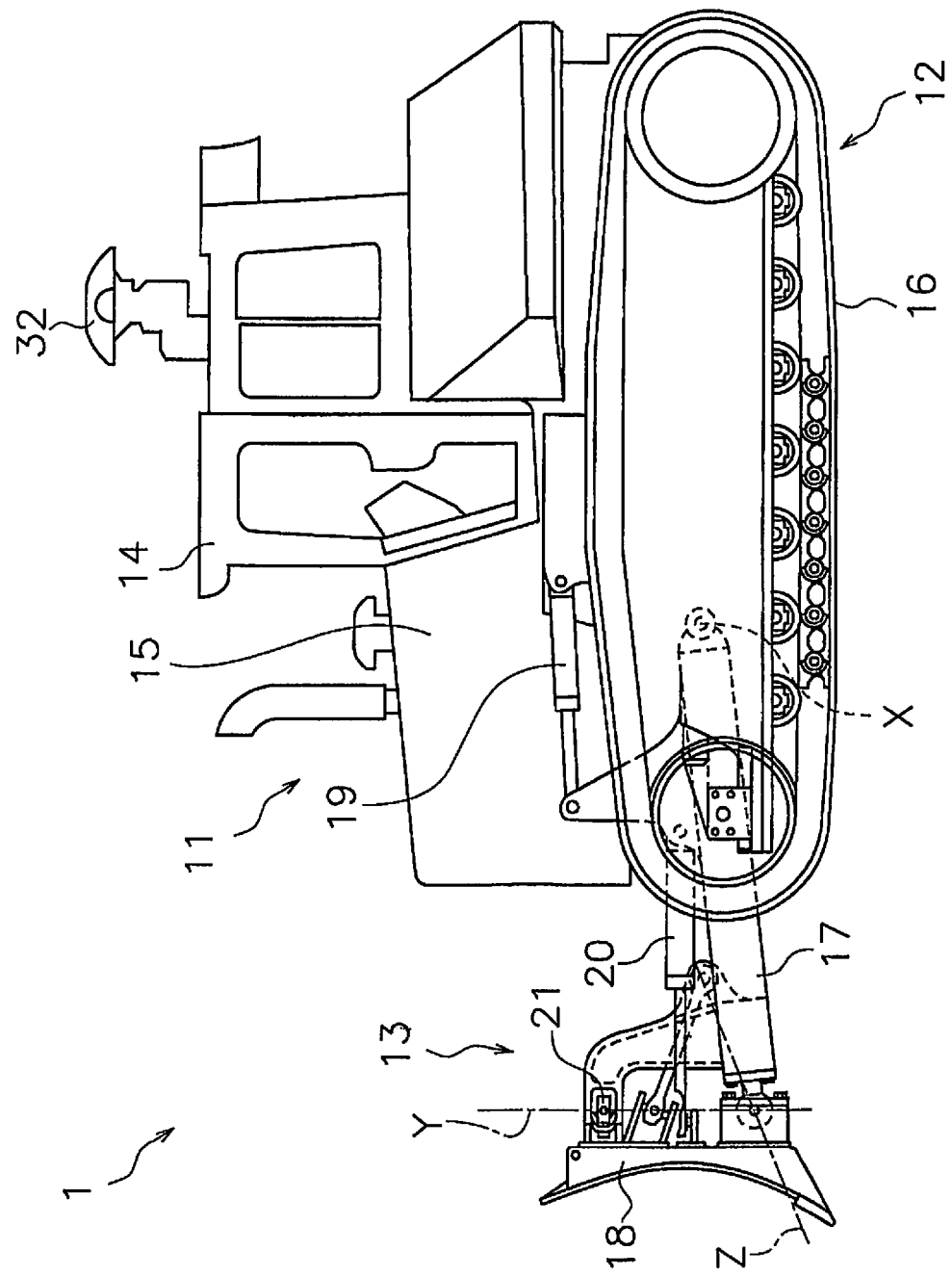
FIG. 1 is a side view of a work vehicle according to an embodiment.

A work vehicle according to an embodiment will be explained in detail with reference to the drawings. FIG. 1 is a side view of the work vehicle 1 according to an embodiment. The work vehicle 1 is a bulldozer according to the present embodiment. The work vehicle 1 is provided with a vehicle body 11, a travel device 12, and a work implement 13.

The vehicle body 11 has an operating cabin 14 and an engine compartment 15. An operator's seat that is not illustrated is disposed inside the operating cabin 14. The engine compartment 15 is disposed in front of the operating cabin 14. The travel device 12 is attached to a bottom part of the vehicle body 11. The travel device 12 has a pair of left and right crawler belts 16. Only the right crawler belt 16 is depicted in FIG. 1. The work vehicle 1 travels due to the rotation of the crawler belts 16.

The work implement 13 is attached to the vehicle body 11. The work implement 13 has a lift frame 17, a blade 18, a lift cylinder 19, an angle cylinder 20, and a tilt cylinder 21.

The lift frame 17 is attached to the vehicle body 11 in a manner that allows movement up and down centered on an axis X that extends in the vehicle width direction. The lift frame 17 supports the blade 18. The blade 18 is disposed in front of the vehicle body 11. The blade 18 moves up and down accompanying the up and down motions of the lift frame 17.

The lift cylinder 19 is coupled to the vehicle body 11 and the lift frame 17. The lift frame 17 rotates up and down centered on the axis X due to the extension and contraction of the lift cylinder 19.

The angle cylinder 20 is coupled to the lift frame 17 and the blade 18. Due to the extension and contraction of the angle cylinder 20, the blade 18 rotates around an axis Y that extends in roughly the up-down direction.

The tilt cylinder 21 is coupled to the lift frame 17 and the blade 18. Due to the extension and contraction of the tilt cylinder 21, the blade 18 rotates around an axis Z that extends in roughly the front-back direction of the vehicle.

Figure 2:
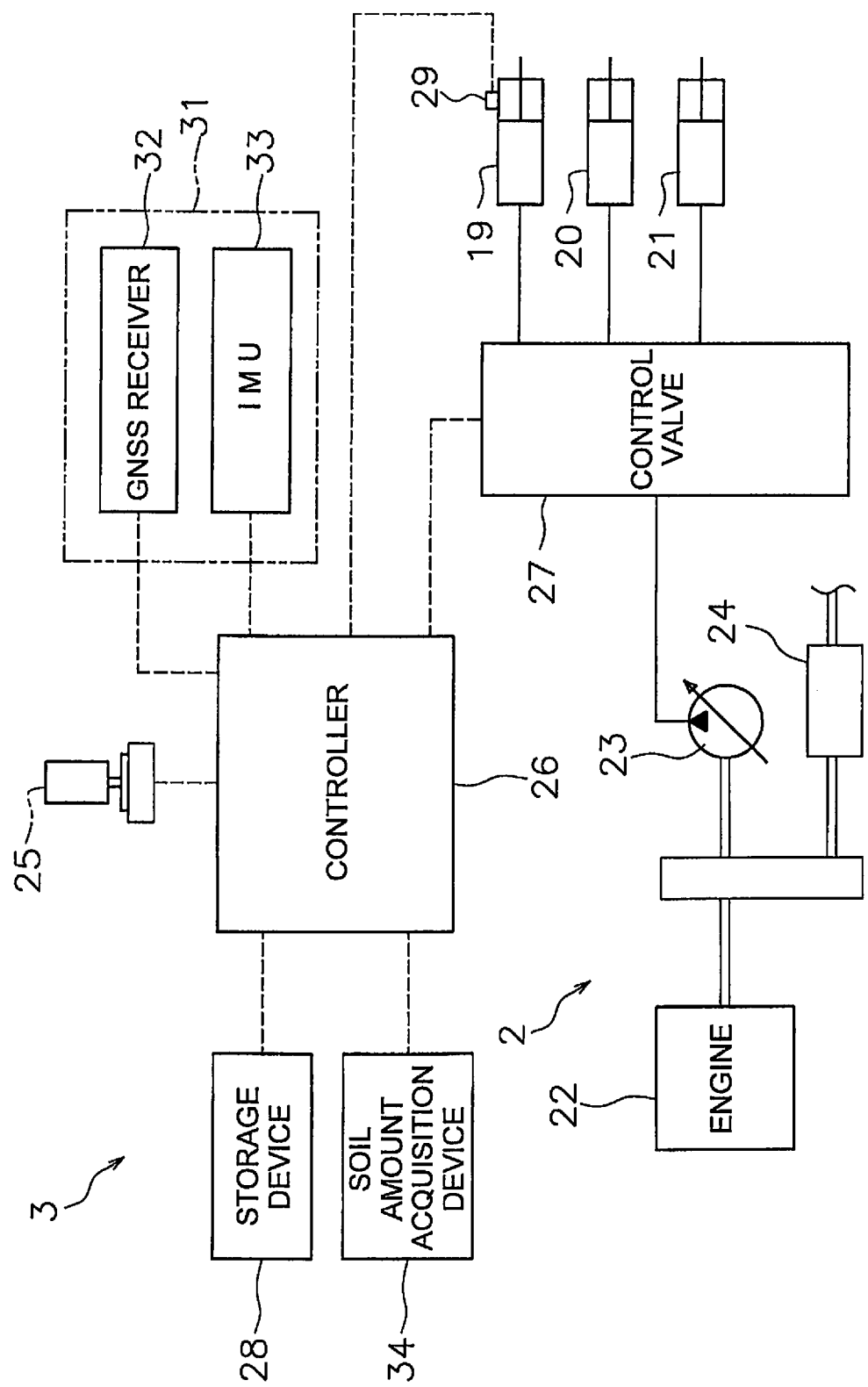
FIG. 2 is a block diagram illustrating a configuration of a drive system and a control system of the work vehicle.

FIG. 2 is a block diagram illustrating a configuration of a drive system 2 and a control system 3 of the work vehicle 1. As illustrated in FIG. 2, the drive system 2 is provided with an engine 22, a hydraulic pump 23, and a power transmission device 24.

The hydraulic pump 23 is driven by the engine 22 and discharges operating fluid. The operating fluid discharged from the hydraulic pump 23 is supplied to the lift cylinder 19, the angle cylinder 20, and the tilt cylinder 21. While only one hydraulic pump 23 is illustrated in FIG. 2, a plurality of hydraulic pumps may be provided.

The power transmission device 24 transmits driving power from the engine 22 to the travel device 12. The power transmission device 24, for example, may be a hydrostatic transmission (HST). Alternatively, the power transmission device 24, for example, may be a transmission having a torque converter or a plurality of speed change gears.

The control system 3 is provided with an operating device 25, a controller 26, and a control valve 27. The operating device 25 is a device for operating the work implement 13 and the travel device 12. The operating device 25 is disposed in the operating cabin 4. The operating device 25 receives operations performed by an operator for driving the work implement 13 and the travel device 12, and outputs operation signals in accordance with the operations. The operating device 25 includes, for example, an operating lever, a pedal, and a switch and the like.

The controller 26 is programmed to control the work vehicle 1 on the basis of acquired information. The controller 26 includes, for example, a processor such as a CPU. The controller 26 acquires operation signals from the operating device 25. The controller 26 controls the control valve 27 on the basis of the operation signals. The controller 26 is not limited to one component and may be divided into a plurality of controllers.

The control valve 27 is a proportional control valve and is controlled by command signals from the controller 26. The control valve 27 is disposed between the hydraulic pump 23 and hydraulic actuators such as the lift cylinder 19, the angle cylinder 20, and the tilt cylinder 21. The amount of the operating fluid supplied from the hydraulic pump 23 to the lift cylinder 19, the angle cylinder 20, and the tilt cylinder 21 is controlled by the control valve 27. The controller 26 generates command signals for the control valve 27 so that the work implement 13 acts in accordance with the abovementioned operations of the operating device 25. As a result, the lift cylinder 19, the angle cylinder 20, and the tilt cylinder 21 and the like are controlled in response to the operation amount of the operating device 25. The control valve 27 may be a pressure proportional control valve. Alternatively, the control valve 27 may be an electromagnetic proportional control valve.

Figure 3:
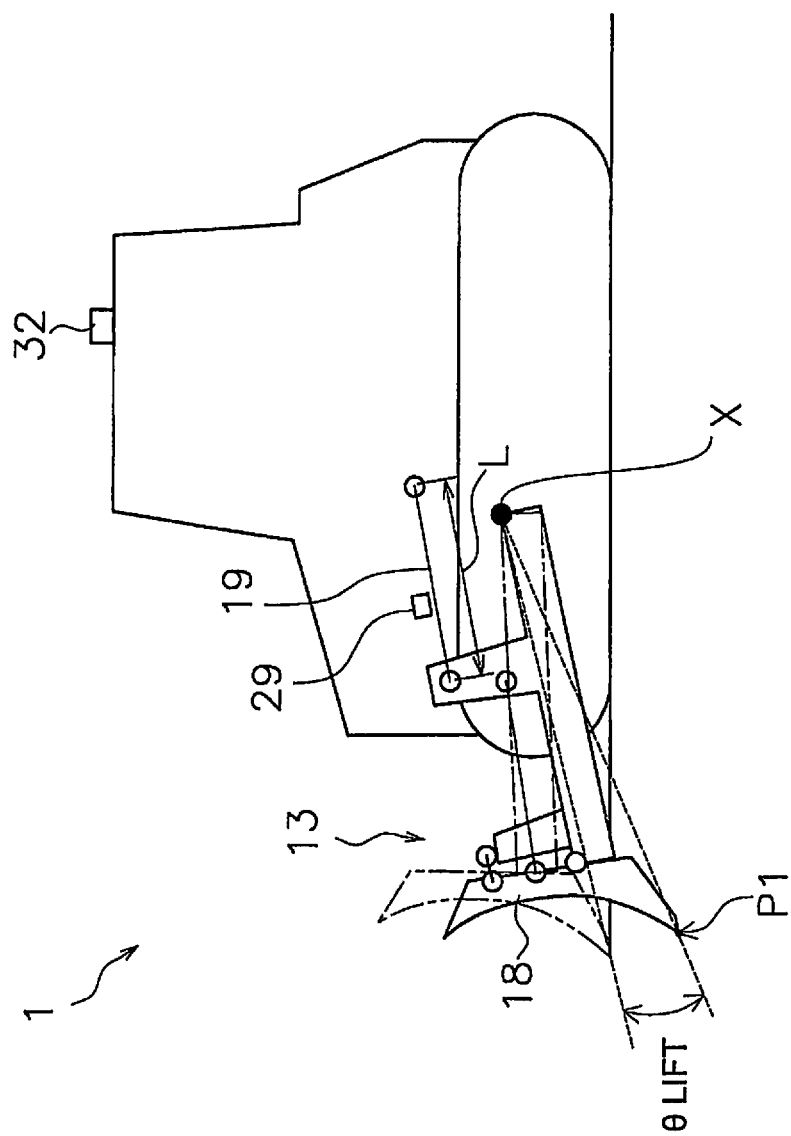
FIG. 3 is a schematic view of a configuration of the work vehicle.

The control system 3 is provided with a lift cylinder sensor 29. The lift cylinder sensor 29 detects the stroke length (referred to below as "lift cylinder length L") of the lift cylinder 19. As depicted in FIG. 3, the controller 26 calculates a lift angle θlift of the blade 18 on the basis of the lift cylinder length L. FIG. 3 is a schematic view of a configuration of the work vehicle 1.

The origin position of the work implement 13 is depicted as the chain double-dashed line in FIG. 3. The origin position of the work implement 13 is the position of the blade 18 while the blade tip is in contact with the ground surface on a horizontal ground surface. The lift angle θlift is the angle from the origin position of the work implement 13.

As illustrated in FIG. 2, the control system 3 is provided with a position detection device 31. The position detection device 31 detects the position of the work vehicle 1. The position detection device 31 is provided with a GNSS receiver 32 and an IMU 33. The GNSS receiver 32 is disposed on the operating cabin 14. The GNSS receiver 32 is, for example, an antenna for a global positioning system (GPS). The GNSS receiver 32 receives vehicle position information which indicates the position of the work vehicle 1. The controller 26 acquires the vehicle position information from the GNSS receiver 32.

The IMU 33 is an inertial measurement unit. The IMU 33 acquires vehicle inclination angle information. The vehicle inclination angle information includes the angle (pitch angle) relative to horizontal in the vehicle front-back direction and the angle (roll angle) relative to horizontal in the vehicle lateral direction. The IMU 33 transmits the vehicle inclination angle information to the controller 26. The controller 26 acquires the vehicle inclination angle information from the IMU 33.

The controller 26 computes a blade tip position P1 from the lift cylinder length L, the vehicle position information, and the vehicle inclination angle information. As illustrated in FIG. 3, the controller 26 calculates global coordinates of the GNSS receiver 32 on the basis of the vehicle position information. The controller 26 calculates the lift angle θlift on the basis of the lift cylinder length L. The controller 26 calculates local coordinates of the blade tip position P1 with respect to the GNSS receiver 32 on the basis of the lift angle θlift and vehicle dimension information. The vehicle dimension information is stored in a storage device 28 and indicates the position of the work implement 13 with respect to the GNSS receiver 32. The controller 26 calculates the global coordinates of the top position P1 on the basis of the global coordinates of the GNSS receiver 32, the local coordinates of the blade tip position P1, and the vehicle inclination angle information. The controller 26 acquires the global coordinates of the blade tip position P1 as blade tip position information.

As illustrated in FIG. 2, the control system 3 is provided with a soil amount acquisition device 34. The soil amount acquisition device 34 acquires soil amount information which indicates the amount of soil held by the work implement 13. The soil amount acquisition device 34 generates a soil amount signal which indicates the soil amount information and sends the soil amount signal to the controller 26. In the present embodiment, the soil amount information indicates the tractive force of the work vehicle 1. The controller 26 calculates the held soil amount from the tractive force of the work vehicle 1. For example, in the work vehicle 1 provided with the HST, the soil amount acquisition device 34 is a sensor for detecting the hydraulic pressure (driving hydraulic pressure) supplied to the hydraulic motor of the HST. In this case, the controller 26 calculates the tractive force from the driving hydraulic pressure and calculates the held soil amount from the calculated tractive force.

Alternatively, the soil amount acquisition device 34 may be a survey device that detects changes in the actual topography. In this case, the controller 26 may calculate the held soil amount from a change in the actual topography. Alternatively, the soil amount acquisition device 34 may be a camera that acquires image information of the soil carried by the work implement 13. In this case, the controller 26 may calculate the held soil amount from the image information.

The control system 3 is provided with the storage device 28. The storage device 28 includes, for example, a memory and an auxiliary storage device. The storage device 28 may be a RAM or a ROM, for example. The storage device 28 may be a semiconductor memory or a hard disk and the like.

The storage device 28 stores design topography information. The design topography information indicates the position and the shape of a final design topography. The final design topography is the target topography of a work target at the work site. The controller 26 acquires actual topography information. The actual topography information indicates the position and shape of the actual topography of the work target at the work site. The controller 26 automatically controls the work implement 13 on the basis of the actual topography information, the design topography information, and the blade tip position information.

Figure 4:
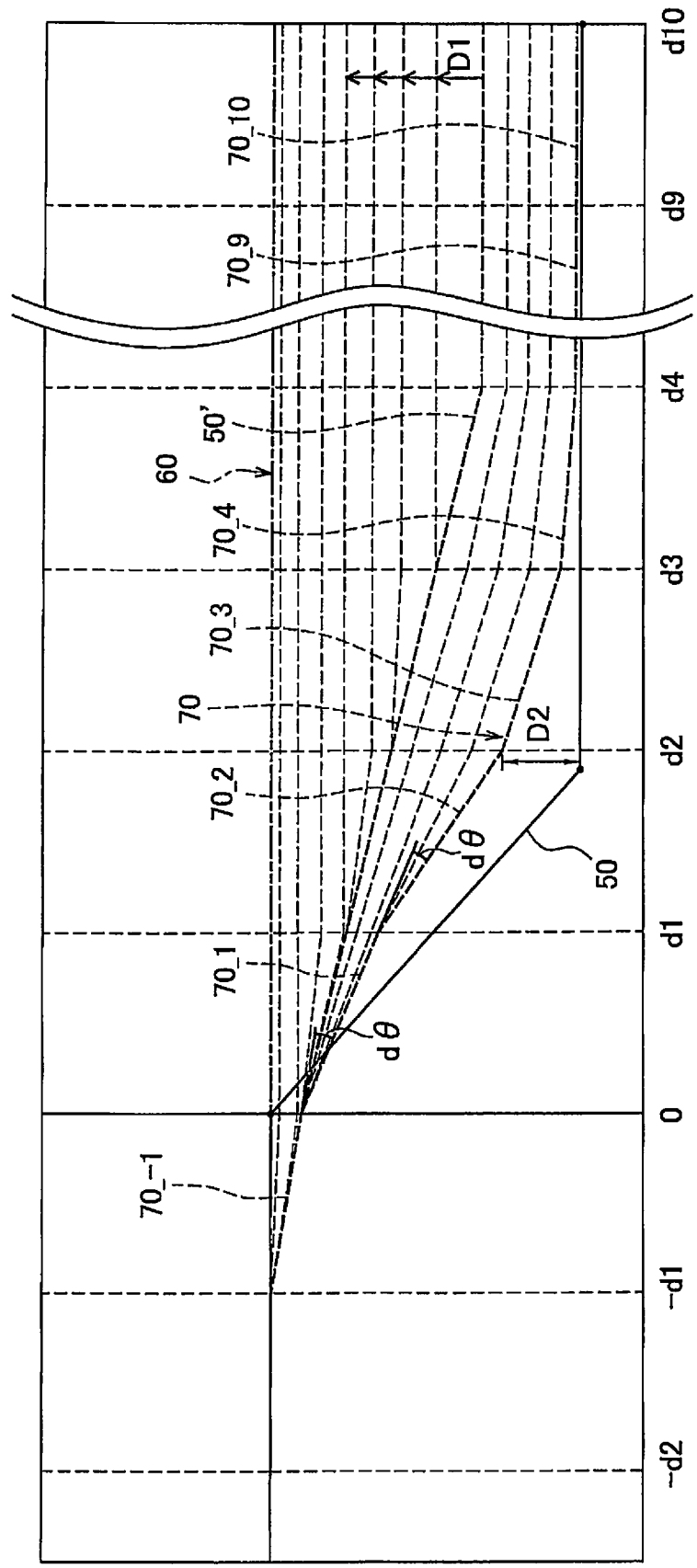
FIG. 4 illustrates an example of an actual topography, a final design topography, and an intermediate design topography during filling work.

Automatic control of the work implement 13 during filling work and executed by the controller 26 will be explained below. FIG. 4 depicts an example of a final design topography 60 and an actual topography 50 positioned below the final design topography 60. During filling work, the work vehicle 1 piles up and compacts the soil on top of the actual topography 50 located below the final design topography 60, whereby the work target is formed so as to become the final design topography 60.

The controller 26 acquires the actual topography information which indicates the actual topography 50. For example, the controller 26 acquires, as the actual topography information, position information which indicates the locus of the blade tip position P1. Therefore, the position detection device 31 functions as an actual topography acquisition device for acquiring the actual topography information.

Alternatively, the controller 26 may calculate the position of the bottom surface of the crawler belt 16 from the vehicle position information and the vehicle dimension information, and may acquire, as the actual topography information, the position information which indicates the locus of the bottom surface of the crawler belt 16. Alternatively, the actual topography information may be generated from survey data measured by a survey device outside of the work vehicle 1. Alternatively, the actual topography 50 may be imaged by a camera and the actual topography information may be generated from image data acquired by the camera.

As illustrated in FIG. 4, the final design topography 60 is horizontal and flat in the present embodiment. A portion or all of the final design topography 60 may be inclined. In FIG. 4, the height of the final design topography in the range from −d2 to 0 is the same as the height of the actual topography 50.

The controller 26 determines an intermediate design topography 70 that is positioned between the actual topography 50 and the final design topography 60. In FIG. 4, a plurality of the intermediate design topographies 70 are indicated by dashed lines; however, only a portion thereof is given the reference numeral "70." As illustrated in FIG. 4, the intermediate design topography 70 is positioned above the actual topography 50 and below the final design topography 60. The controller 26 determines the intermediate design topography 70 on the basis of the actual topography information, the design topography information, and the soil amount information.

The intermediate design topography 70 is set to the position of a prescribed distance D1 above the actual topography 50. The controller 26 determines the next intermediate design topography 70 at the position of the prescribed distance D1 above the updated actual topography 50 each time the actual topography 50 is updated. As a result, the plurality of intermediate design topographies 70 which are stacked on the actual topography 50 are generated as illustrated in FIG. 4. The processing for determining the intermediate design topography 70 is explained in detail below.

The controller 26 controls the work implement 13 on the basis of the intermediate topography information which indicates the intermediate design topography 70 and the blade tip position information which indicates the blade tip position P1. Specifically, the controller 26 generates command signals for the work implement 13 so as to move the blade tip position P1 of the work implement 13 along the intermediate design topography 70.

Figure 5:
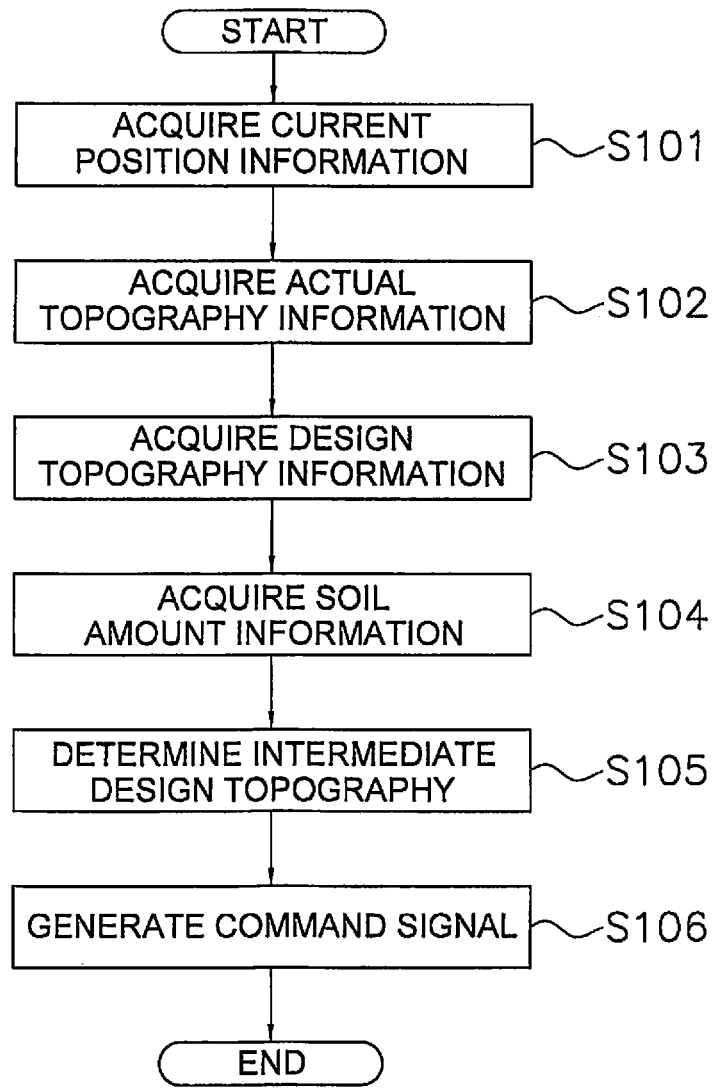
FIG. 5 is a flow chart depicting automatic control processing of the work implement during filling work.
Figure 6:
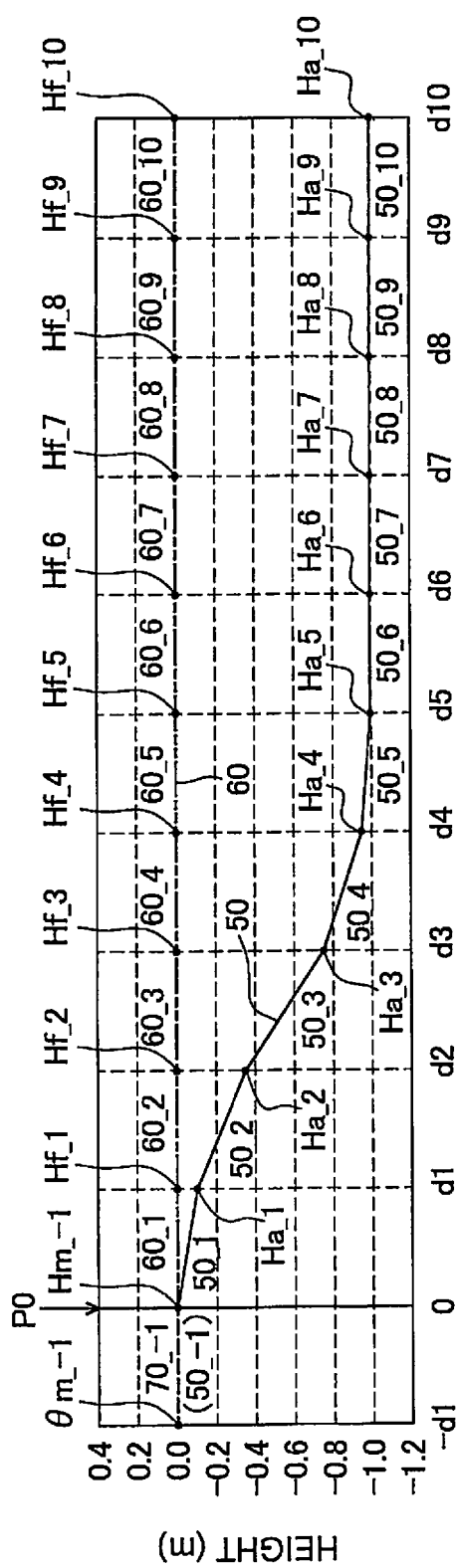
FIG. 6 illustrates an example of actual topography information.

FIG. 5 is a flow chart depicting automatic control processing of the work implement 13 during filling work. As illustrated in FIG. 5, the controller 26 acquires current position information in step S101. As illustrated in FIG. 6, the controller 26 acquires the height Hm_−1 of an intermediate design surface 70_−1 that is one position before a previously determined reference position P0, and a pitch angle θm_−1 of the intermediate design surface 70_−1.

However, during the initial state of the filling work, the controller 26 acquires the height of the actual surface 50_−1 which is one surface before the reference position P0 in place of the height Hm_−1 of the intermediate design topography 70_−1 that is one position before the previously determined reference position P0. During the initial state of the filling work, the controller 26 acquires the pitch angle of the actual surface 50_−1 which is one position before the reference position P0 in place of the pitch angle θm_−1 of the intermediate design topography 70_−1 That is one position before the previously determined reference position P0. The initial state of the filling work can be a state when the work vehicle is switched, for example, from reverse travel to forward travel.

In step S102, the controller 26 acquires the actual topography information. As illustrated in FIG. 6, the actual topography 50 includes a plurality of actual surfaces 50_1 to 50_10 which are divided by a predetermined interval d1 from the predetermined reference position P0 in the traveling direction of the work vehicle 1. The reference position P0 is the position where the actual topography 50 starts to slope downward from the final design topography 60 in the traveling direction of the work vehicle 1. In other words, the reference position P0 is the position where the height of the actual topography 50 starts to become smaller than the height of the final design topography 60 in the traveling direction of the work vehicle 1. Alternatively, the reference position P0 is a position in front of the work vehicle 1 by a predetermined distance. Alternatively, the reference position P0 is the current position of the blade tip position P1 of the work vehicle 1. Alternatively, the reference position P0 may be a position at the top of the slope of the actual topography 50. In FIG. 6, the vertical axis represents the height of the topography and the horizontal axis represents the distance from the reference position P0.

The actual topography information includes the position information of the actual surfaces 50_1 to 50_10 for each predetermined interval d1 from the reference position P0 in the traveling direction of the work vehicle 1. That is, the actual topography information includes the position information of the actual surfaces 50_1 to 50_10 from the reference position P0 as far forward as the predetermined distance d10.

As illustrated in FIG. 6, the controller 26 acquires the heights Ha_1 to Ha_10 of the actual surfaces 50_1 to 50_10 as the actual topography information. In the present embodiment, the actual surfaces acquired as the actual topography information include up to ten actual surfaces; however, the number of actual surfaces may be more than ten or less than ten.

In step S103, the controller 26 acquires the design topography information. As illustrated in FIG. 6, the final design topography 60 includes a plurality of final design surfaces 60_1 to 60_10. Therefore, the design topography information includes the position information of the final design surfaces 60_1 to 60_10 at each predetermined interval d1 in the traveling direction of the work vehicle 1. That is, the design topography information includes the position information of the final design surfaces 60_1 to 60_10 from the reference position P0 as far forward as the predetermined distance d10.

As illustrated in FIG. 6, the controller 26 acquires the heights Hf_1 to Hf 10 of the final design surfaces 60_1 to 60_10 as the design topography information. In the present embodiment, the number of final design surfaces acquired as the design topography information includes up to ten final design surfaces; however, the number of final design surfaces may be more than ten or less than ten.

In step S104, the controller 26 acquires the soil amount information. In this case, the controller 26 acquires the current held soil amount Vs_0. The held soil amount Vs_0 is represented, for example, as a ratio with respect to the capacity of the blade 18.

In step S105, the controller 26 determines the intermediate design topography 70. The controller 26 determines the intermediate design topography 70 from the actual topography information, the design topography information, the soil amount information, and the current position information. The processing for determining the intermediate design topography 70 is explained in detail below.

Figure 7:
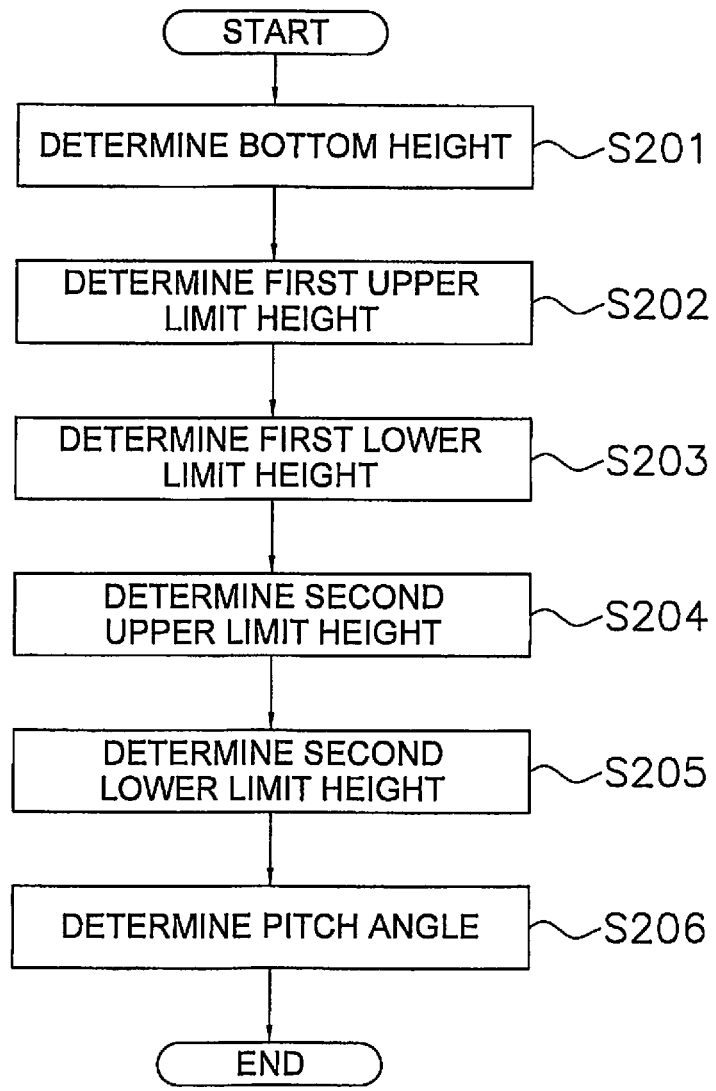
FIG. 7 is a flow chart depicting processing for determining the intermediate design topography.

FIG. 7 is a flow chart depicting processing for determining the intermediate design topography 70. In step S201, the controller 26 determines a bottom height Hbottom. In this case, the controller 26 determines the bottom height Hbottom so that the bottom soil amount coincides with the held soil amount.

Figure 8:
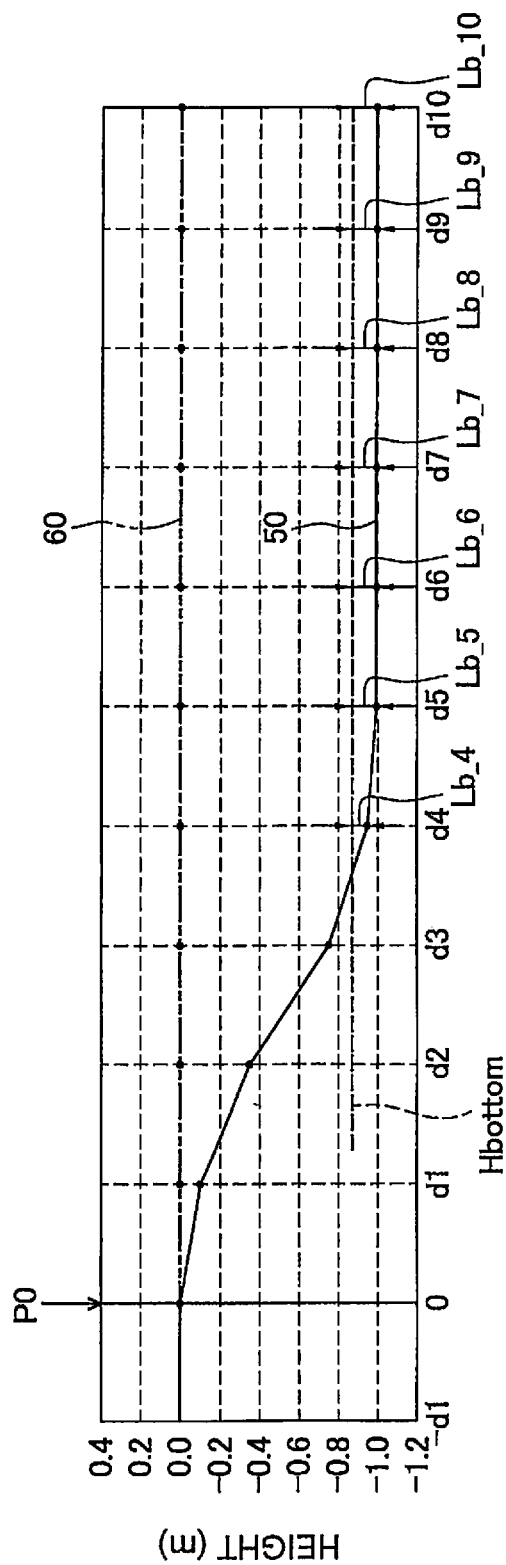
FIG. 8 illustrates processing for determining a bottom height.

As illustrated in FIG. 8, the bottom soil amount represents the amount of soil piled below the bottom height Hbottom and above the actual surface 50. For example, the controller 26 calculates the bottom height Hbottom from the product of the total of bottom lengths Lb_4 to Lb_10 and the predetermined distance d1, and from the held soil amount. The bottom lengths Lb_4 to Lb_10 represent the distance from the actual topography 50 upwards to the bottom height Hbottom.

In step S202, the controller 26 determines a first upper limit height Hup1. The first upper limit height Hup1 defines an upper limit of the height of the intermediate design topography 70. However, the intermediate design topography 70 may be determined to be positioned above the first upper limit height Hup1 in response to other conditions. The first upper limit height Hup1 is defined using the following equation 1.

$$Hup1 = \text{MIN}(\text{final design topography}, \text{actual topography} + D1) \quad \text{(Equation 1)}$$

Figure 9:
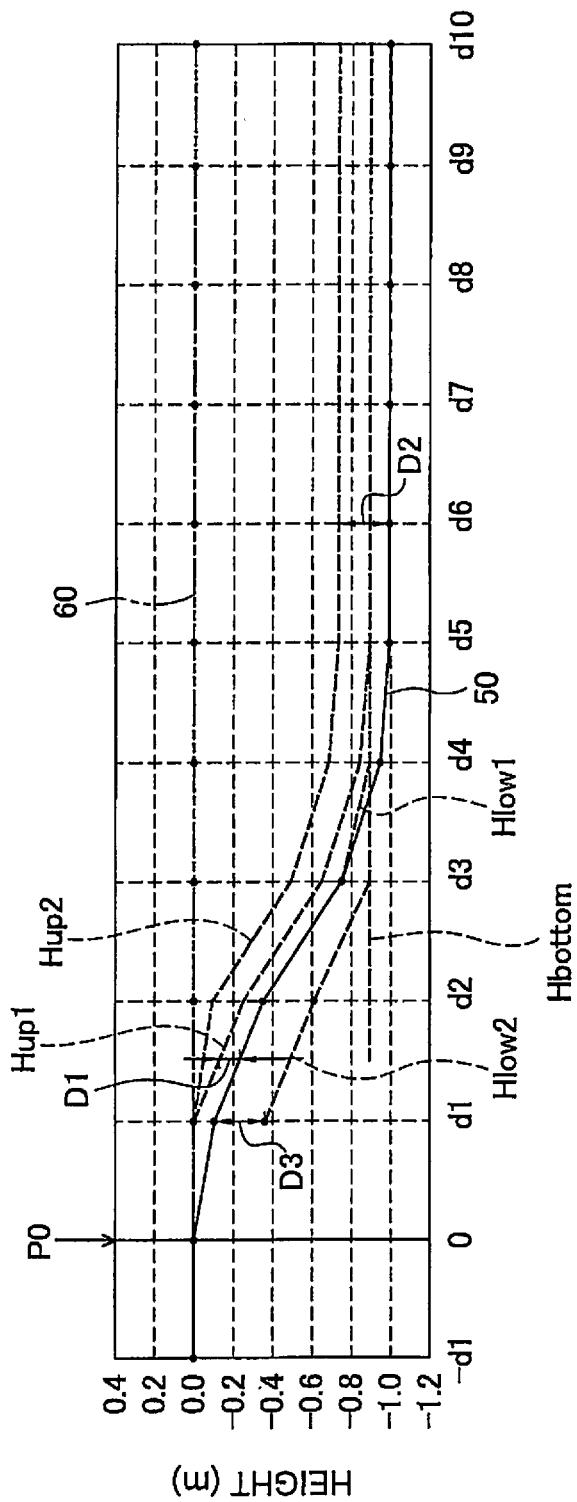
FIG. 9 illustrates a first upper limit height, a first lower limit height, a second upper limit height, and a second lower limit height.

Therefore as illustrated in FIG. 9, the first upper limit height Hup1 is positioned below the final design topography 60 and above the actual topography 50 by a predetermined distance D1. The predetermined distance D1 is the thickness of the piled soil to a degree that the piled soil can be appropriately compacted by the work vehicle 1 traveling one time over the piled soil.

In step S203, the controller 26 determines a first lower limit height Hlow1. The first lower limit height Hlow1 defines a lower limit of the height of the intermediate design topography 70. However, the intermediate design topography 70 may be determined to be positioned below the first lower limit height Hlow1 in response to other conditions. The first lower limit height Hlow1 is defined using the following equation 2.

$$Hlow1 = \text{MIN}(\text{final design topography}, \text{MAX}(\text{actual topography}, \text{bottom})) \quad \text{(Equation 2)}$$

Therefore as illustrated in FIG. 9, when the actual topography 50 is positioned below the final design topography 60 and above the abovementioned bottom height Hbottom, the first lower limit height Hlow1 coincides with the actual topography 50. Additionally, when the bottom height Hbottom is positioned below the final design topography 60 and above the actual topography 50, the first lower limit height Hlow1 coincides with the bottom height Hbottom.

In step S204, the controller 26 determines a second upper limit height Hup2. The second upper limit height Hup2 defines an upper limit of the height of the intermediate design topography 70. The second upper limit height Hup2 is defined using the following equation 3.

$$Hup2 = \text{MIN}(\text{final design topography}, \text{MAX}(\text{actual topography} + D2, \text{bottom})) \quad \text{(Equation 3)}$$

Therefore as illustrated in FIG. 9, the second upper limit height Hup2 is positioned below the final design topography 60 and above the actual topography 50 by a predetermined distance D2. The predetermined distance D2 is larger than the predetermined distance D1.

In step S205, the controller 26 determines a second lower limit height Hlow2. The second lower limit height Hlow2 defines a lower limit of the height of the intermediate design topography 70. The second lower limit height Hlow2 is defined using the following equation 4.

$$Hlow2 = \text{MIN}(\text{final design topography} - D3, \text{MAX}(\text{actual topography} - D3, \text{bottom})) \quad \text{(Equation 4)}$$

Therefore as illustrated in FIG. 9, the second lower limit height Hlow2 is positioned below the final design topography 60 by a predetermined distance D3. The second lower limit height Hlow2 is positioned below the first lower limit height Hlow1 by the predetermined distance D3.

In step S206, the controller 26 determines the pitch angle of the intermediate design topography. As illustrated in FIG. 4, the intermediate design topography includes the plurality of intermediate design surfaces 70_1 to 70_10 separated from each other by the predetermined distance d1. The controller 26 determines the pitch angle for each of the plurality of intermediate design surfaces 70_1 to 70_10. The intermediate design topography 70 depicted in FIG. 4 has different pitch angles for the respective intermediate design surfaces 70_1 to 70_4. In this case, the intermediate design topography 70 has a shape that is bent at a plurality of locations as illustrated in FIG. 4.

Figure 10:
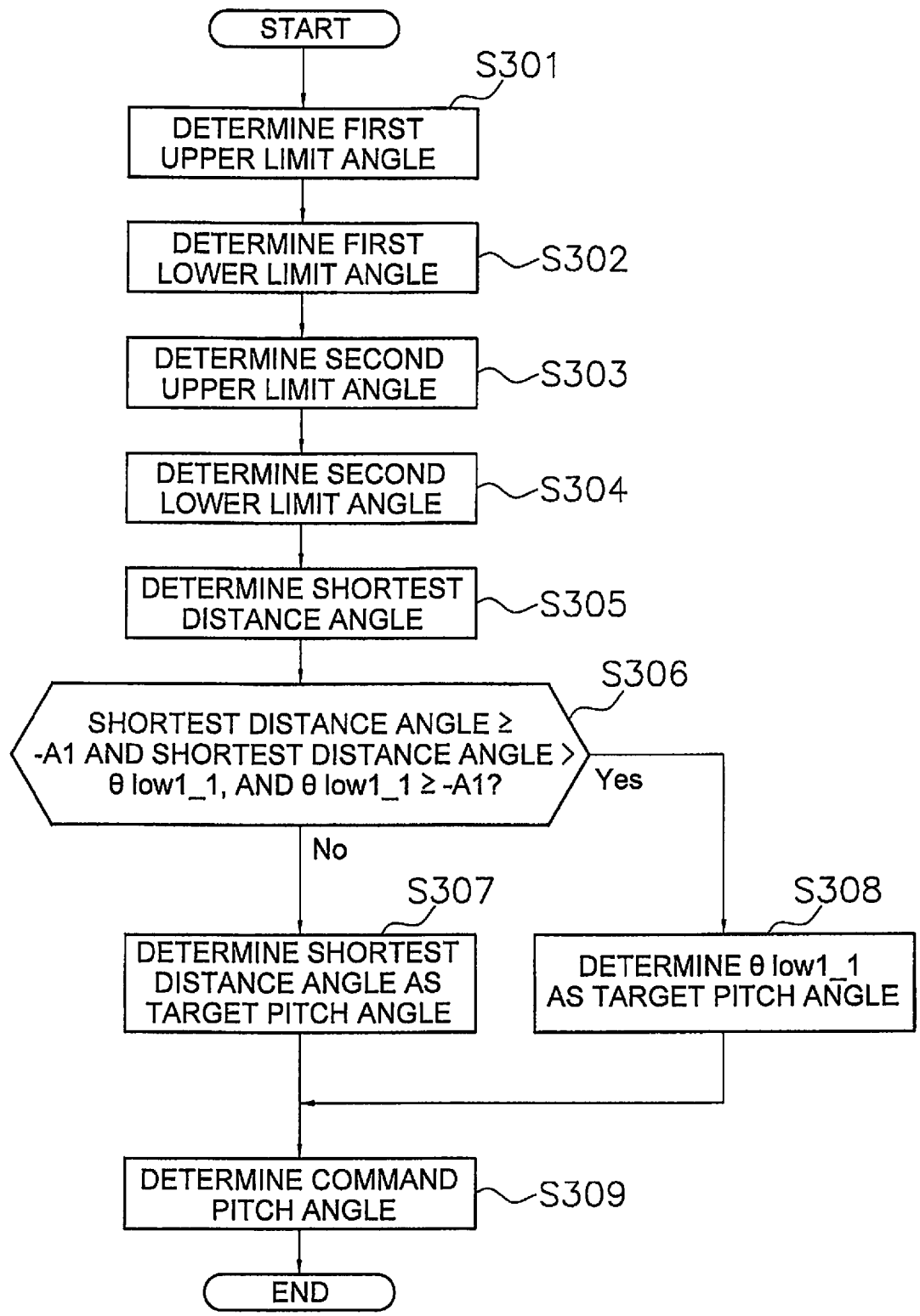
FIG. 10 is a flow chart depicting processing for determining a pitch angle of the intermediate design topography.

FIG. 10 is a flow chart depicting processing for determining a pitch angle of the intermediate design topography 70. The controller 26 determines the pitch angle of the intermediate design surface 70_1 that is one position ahead the reference position P0 by using the processing depicted in FIG. 10.

In step S301, the controller 26 determines a first upper limit angle θup1 as illustrated in FIG. 10. The first upper limit angle θup1 defines an upper limit of the pitch angle of the intermediate design topography 70. However, the pitch angle of the intermediate design topography 70 may be larger than the first upper limit angle θup1 in response to other conditions.

Figure 11:
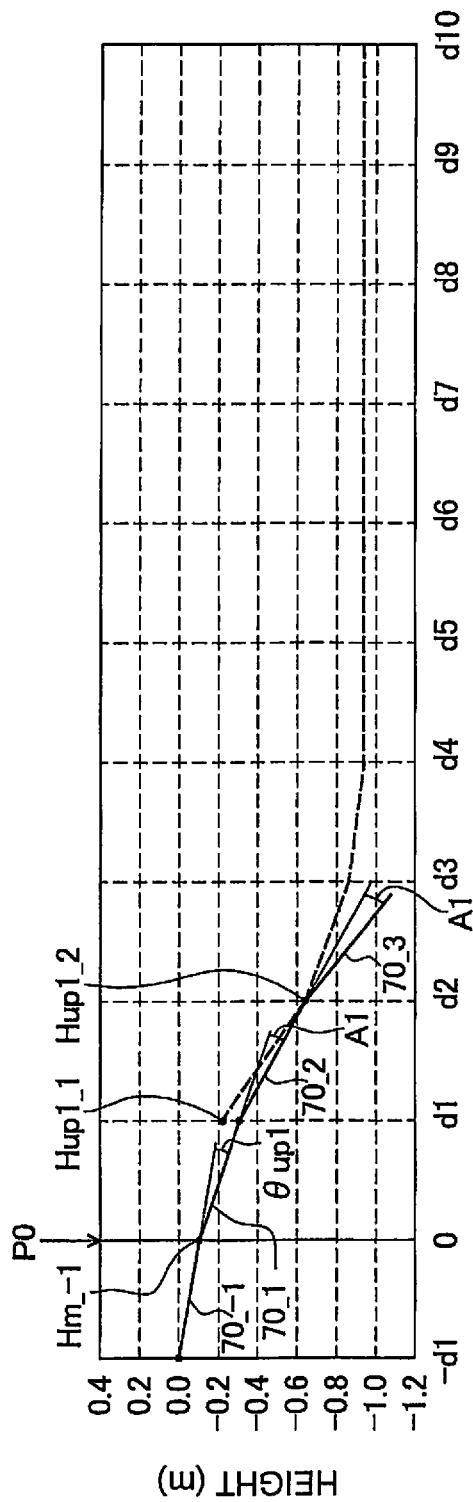
FIG. 11 illustrates processing for determining a first upper limit angle.

As illustrated in FIG. 11, the first upper limit angle θup1 is the pitch angle of the intermediate design surface 70_1 so that the intermediate design surface 70_1 does not exceed the first upper limit height Hup1 up to the distance d10 when the pitch angle of the intermediate design topography 70 is set to the degree (previous degree−A1) for each interval d1. The first upper limit angle θup1 is determined as indicated below.

When the pitch angle of the intermediate design topography 70 is set as the degree (previous degree−A1) at each interval d1, a pitch angle θn of the intermediate design surface 70_1 is determined using the following equation 5 such that the nth ahead intermediate design surface 70_n is equal to or less than the first upper limit height Hup1.

$$\theta n = (Hup1\_n - Hm\_{-1} + A1 * (n*(n-1)/2))/n \quad \text{(Equation 5)}$$

Hup1_n is the first upper limit height Hup1 at the nth ahead intermediate design surface 70_n. Hm_−1 is the height of the intermediate design surface 70_−1 which is one position behind the reference position P0. A1 is a predetermined constant. θn values are determined from n=1 to 10 using equation 5, and the minimum of the θn values is selected as the first upper limit angle θup1. In FIG. 11, the minimum of the θn values from n=1 to 10 becomes the pitch angle 62 that does not exceed the first upper limit height Hup1 at the distance d2 in front of the reference position P0. In this case, θ2 is selected as the first upper limit angle θup1.

However, when the selected first upper limit angle θup1 is larger than a predetermined change upper limit θlimit1, the change upper limit θlimit1 is selected as the first upper limit angle θup1. The change upper limit θlimit1 is a threshold for limiting the change in the pitch angle from the previous pitch angle to +A1 or less.

In the present embodiment, while the pitch angle is determined on the basis of the intermediate design surfaces 70_1 to 70_10 as far as ten positions in front of the reference position P0, the number of intermediate design surfaces used in the computation of the pitch angle is not limited to ten and may be more than ten or less than ten.

Figure 12:
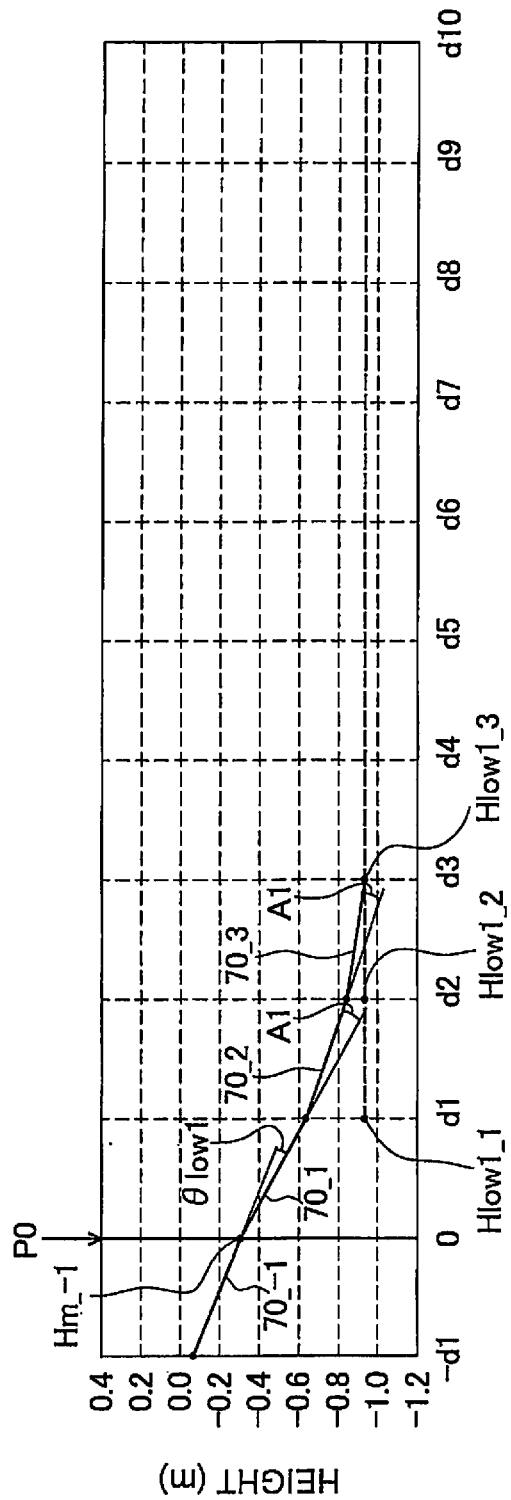
FIG. 12 illustrates processing for determining a first lower limit angle.

In step S302, the controller 26 determines a first lower limit angle θlow1. The first lower limit angle θlow1 defines a lower limit of the pitch angle of the intermediate design topography 70. However, the pitch angle of the intermediate design topography 70 may be less than the first lower limit angle θlow1 in response to other conditions. As illustrated in FIG. 12, the first lower limit angle θlow1 is the pitch angle of the intermediate design surface 70_1 so that the intermediate design surface 70_1 does not fall below the first lower limit height Hlow1 as far forward as the distance d10 when the pitch angle of the intermediate design topography 70 is set to the degree (previous degree−A1) for each interval d1. The first lower limit angle θlow1 is determined as indicated below.

When the pitch angle of the intermediate design topography 70 is set as the degree (previous degree+A1) at each interval d1, one pitch angle θn in front is determined using the following equation 6 such that the nth ahead intermediate design surface 70_n is equal to or greater than the first lower limit height Hlow1.

$$θn=(Hlow1\_n-Hm\_-1-A1*(n*(n-1)/2))/n \quad \text{(Equation 6)}$$

Hlow1_n is the first lower limit height Hlow1 with respect to the nth ahead intermediate design surface 70_n. θn values are determined from n=1 to 10 using equation 6, and the maximum of the θn values is selected as the first lower limit angle θlow1. In FIG. 12, the maximum θn value from n=1 to 10 becomes the pitch angle θ3 that does not exceed the first upper limit height Hup1 at the distance d3 in front of the reference position P0. In this case, θ3 is selected as the first lower limit angle θlow1.

However, when the selected first lower limit angle θlow1 is smaller than a predetermined change lower limit θlimit2, the change lower limit θlimit2 is selected as the first lower limit angle θlow1. The change lower limit θlimit2 is a threshold for limiting the change in the pitch angle from the previous pitch angle to −A1 or greater.

In step S303, the controller 26 determines a second upper limit angle θup2. The second upper limit angle θup2 defines an upper limit of the pitch angle of the intermediate design topography 70. The second upper limit angle θup2 is the pitch angle of the intermediate design surface 70_1 that the intermediate design surface 70_1 does not exceed the second upper limit height Hup2 as far forward as the distance d10 when the pitch angle of the intermediate design topography 70 is set to the degree (previous degree−A1) for each interval d1. The second upper limit angle θup2 is determined in the same way as the first upper limit angle θup1 with the following equation 7.

$$θn=(Hup2\_n-Hm\_-1+A1*(n*(n-1)/2))/n \quad \text{(Equation 7)}$$

Hup2_n is the second upper limit height Hup2 at the nth ahead intermediate design surface 70_n. θn values are determined from n=1 to 10 using equation 7, and the minimum θn value is selected as the second upper limit angle θup2.

In step S304, the controller 26 determines a second lower limit angle θlow2. The second lower limit angle θlow2 defines a lower limit of the pitch angle of the intermediate design topography 70. The second lower limit angle θlow2 is the pitch angle of the intermediate design surface 70 one position in front of the reference position P0 that the intermediate design surface 70 does not fall below the second lower limit height Hlow2 as far forward as the distance d10 when the pitch angle of the intermediate design topography 70 is set to the degree (previous degree+A2) for each interval d1. The angle A2 is larger than the abovementioned angle A1. The second lower limit angle θlow2 is defined using the following equation 8 in the same way as the first lower limit angle θlow1.

$$θn=(Hlow2\_n-Hm\_-1-A2*(n*(n-1)/2))/n \quad \text{(Equation 8)}$$

Hlow2_n is the second lower limit height Hlow2 at the nth ahead intermediate design surface 70_n. A2 is a predetermined constant. θn values are determined from n=1 to 10 using equation 8, and the maximum θn value is selected as the second lower limit angle θlow2.

However, when the selected second lower limit angle θlow2 is smaller than a predetermined change lower limit θlimit3, the change lower limit θlimit3 is selected as the first lower limit angle θlow1. The change lower limit θlimit3 is a threshold for limiting the change in the pitch angle from the previous pitch angle to −A2 or greater.

Figure 13:
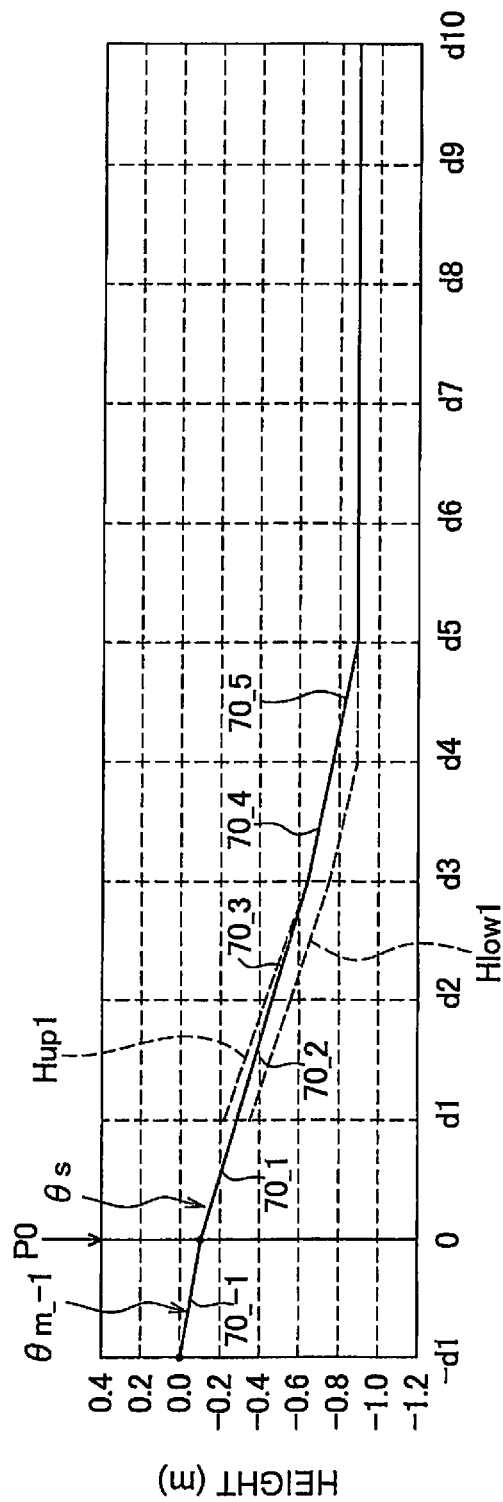
FIG. 13 illustrates processing for determining a shortest distance angle.

In step S305, the controller 26 determines a shortest distance angle θs. As illustrated in FIG. 13, the shortest distance angle θs is the pitch angle of the intermediate design topography 70 that has the shortest length of the intermediate design topography 70 between the first upper limit height Hup1 and the first lower limit height Hlow1. For example, the shortest distance angle θs is determined using the following equation 9.

$$θs=MAX(θlow1\_1,MIN(θup1\_1,MAX(θlow1\_2,MIN(θup1\_2,\ldots MAX(θlow1\_n, MIN(θup1\_n,\ldots MAX(θlow1\_10,MIN(θup1\_10,θm\_-1)))\ldots))) \quad \text{(Equation 9)}$$

Figure 14:
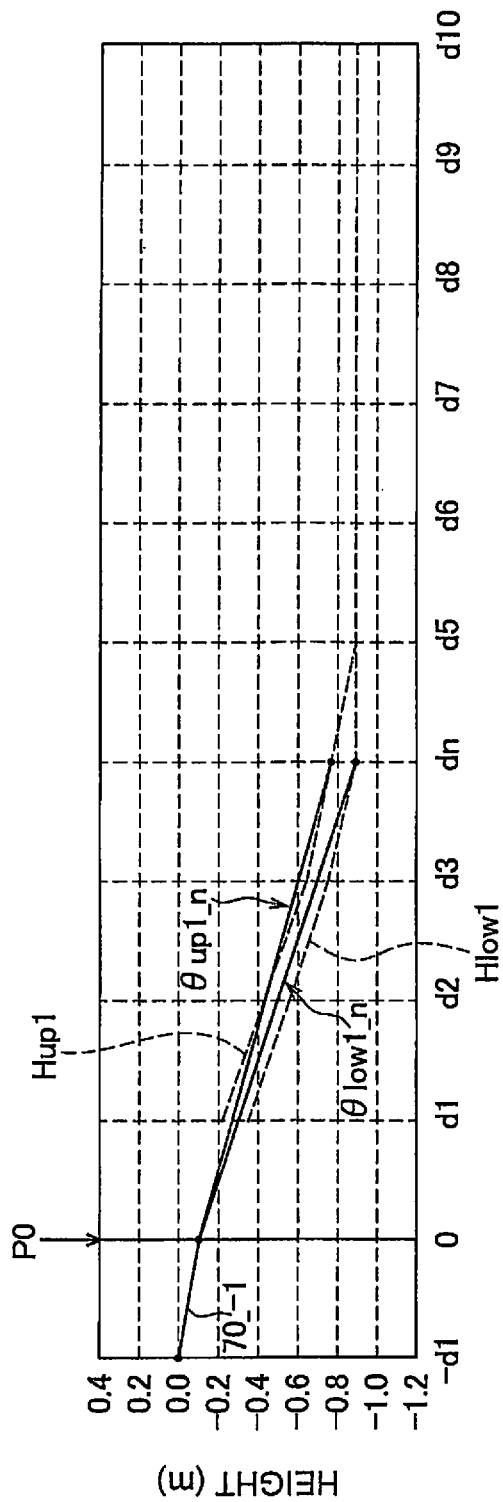
FIG. 14 illustrates processing for determining a shortest distance angle.
Figure 15:
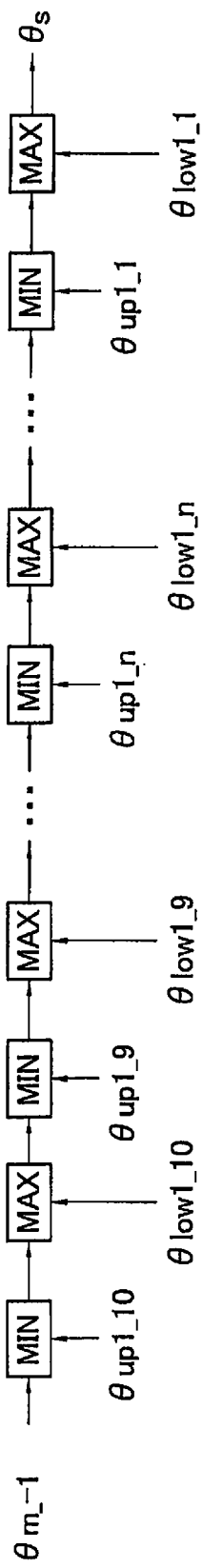
FIG. 15 illustrates processing for determining a shortest distance angle.

As illustrated in FIG. 14, θlow1_n is the pitch angle of a straight line that connects the reference position P0 and the nth ahead first lower limit height Hlow1 (four in front in FIG. 14). θup1_n is the pitch angle of a straight line that connects the reference position P0 and the nth ahead first upper limit height Hup1. θm_−1 is the pitch angle of the intermediate design surface 70_−1 which is one position in front of the reference position P0. Equation 9 can be represented as indicated in FIG. 15.

In step S306, the controller 26 determines whether predetermined pitch angle change conditions are satisfied. The pitch angle change conditions are conditions which indicate that the intermediate design topography 70 is formed so as to be inclined by an angle −A1 or greater. That is, the pitch angle change conditions indicate that a gradually sloped intermediate design topography 70 has been generated.

Specifically, the pitch angle change condition includes the following first to third change conditions. The first change condition is that the shortest distance angle θs is an angle −A1 or greater. The second change condition is that the shortest distance angle θs is greater than θlow1_1. The third change condition is that θlow1_1 is an angle −A1 or greater. When all of the first to third conditions are satisfied, the controller 26 determines that the pitch angle change conditions are satisfied.

The routine advances to step S307 if the pitch angle change conditions are not satisfied. In step S307, the controller 26 determines the shortest distance angle θs derived in step S306 as a target pitch angle θt.

The routine advances to step S308 if the pitch angle change conditions are satisfied. In step S308, the controller 26 determines θlow1_1 as the target pitch angle θt. θlow1_1 is the pitch angle that follows the first lower limit height Hlow1.

In step S309, the controller 26 determines a command pitch angle. The controller 26 determines a command pitch angle θc using the following equation 10.

$$θc=MAX(θlow2, MIN(θup2,MAX(θlow1,MIN(θup1,θt)))) \quad \text{(Equation 10)}$$

The command pitch angle determined as indicated above is determined as the pitch angle of the intermediate design surface 70_1 in step S206 in FIG. 7. As a result, the intermediate design topography 70 is determined in step S105 in FIG. 5. That is, the intermediate design surface 70_1 that fulfills the abovementioned command pitch angle is determined for the intermediate design topography 70 at the reference position P0.

As illustrated in FIG. 5, the controller 26 generates a command signal for the work implement 13 in step S106. In this case, the controller 26 generates a command signal for the work implement 13 so as to move the blade tip position P1 of the work implement 13 along the determined intermediate design topography 70. In addition, the controller 26 generates a command signal for the work implement 13 so that the blade tip position P1 of the work implement 13 does not go above the final design topography 60. The generated command signals are input to the control valve 27. Consequently, the work implement 13 is controlled so that the blade tip position P1 of the work implement 13 moves along the intermediate design topography 70.

The processing illustrated in FIG. 5, FIG. 7 and FIG. 10 is repeated and the controller 26 acquires new actual topography information and updates the actual topography information. For example, the controller 26 may acquire and update the actual topography information in real time. Alternatively, the controller may acquire and update the actual topography information when a predetermined action is carried out.

The controller 26 determines the next intermediate design topography 70 on the basis of the updated actual topography information. The work vehicle 1 then moves the work implement 13 along the intermediate design topography 70 while traveling forward again, and upon reaching a certain position, the work vehicle 1 travels backward and returns. The work vehicle 1 repeats the above actions whereby the soil is repeatedly stacked on the actual topography 50. Consequently, the actual topography 50 is gradually piled up and as a result the final design topography 60 is formed.

The intermediate design topography 70 is determined as depicted in FIG. 4 as a result of the above processing. Specifically, the intermediate design topography 70 is determined so as to conform to the following conditions.

(1) The first condition is that the intermediate design topography 70 is lower than the first upper limit height Hup1. According to the first condition, the intermediate design topography 70 can be determined that is stacked on the actual topography 50 with a thickness within the predetermined distance D1 as illustrated in FIG. 4. As a result, the stacked thickness of the piled soil can be held to within D1 so long as there are no constraints due to other conditions. As a result, the vehicle does not have to repeatedly travel over the piled soil to compact the piled soil. Consequently, work efficiency can be improved.

(2) The second condition is that the intermediate design topography 70 is higher than the first lower limit height Hlow1. According to the second condition, scraping away of the actual topography 50 can be suppressed so long as there are no constraints due to other conditions.

(3) The third condition is that the intermediate design topography 70 approaches the first lower limit height Hlow1 while the pitch angle of the intermediate design topography 70 at each interval d1 is limited to be equal to or less than the angle (previous angle−A1). According to the third condition, the change dθ of the pitch angle in the downward direction can be limited to be equal to or less than the angle A1. As a result, a sudden change in the attitude of the vehicle body can be prevented and the work can be performed at a high speed. As a result, work efficiency can be improved. In particular, the inclination angle of the intermediate design topography 70 near the top of the slope is gentler and a change of the attitude of the work vehicle 1 at the top of the slope can be reduced.

(4) The fourth condition is that the pitch angle intermediate design topography 70 is greater than the first lower limit angle θlow1. According to the fourth condition, the change dθ of the pitch angle in the upward direction can be limited to be equal to or less than the angle A1. As a result, a sudden change in the attitude of the vehicle body 11 can be prevented and the work can be performed at a high speed. As a result, work efficiency can be improved. In particular, the inclination angle of the intermediate design topography 70 near the bottom of the slope can be gentler. Furthermore, scraping away of the actual topography 50 below the first lower limit height Hlow1 can be suppressed when the intermediate design topography 70 is set below the first lower limit height Hlow1 due to modification of the pitch angle.

(5) The fifth condition is that the shortest distance angle θs is selected as the pitch angle of the intermediate design topography 70 when the shortest distance angle θs is greater than the first lower limit angle θlow1. According to the fifth condition, the bending points of the intermediate design topography 70 can be reduced each time the stacking is repeated, and the maximum inclination angle of the intermediate design topography 70 can be gentler as illustrated in FIG. 4. As a result, a gradually smoother intermediate design topography can be generated each time stacking is repeated.

(6) The sixth condition is that θlow1_1 along the first lower limit height Hlow1 is selected as the pitch angle of the intermediate design topography 70 when the pitch angle change conditions are satisfied. After a gentle inclined surface at the inclination angle A1 is formed in front of the work vehicle 1 on the actual topography 50' as illustrated in FIG. 4 as a result of the fifth condition, the soil piling of the actual topography 50' at the back of the inclined surface can be prioritized.

(7) The seventh condition is that the bottom height Hbottom is determined so that the bottom soil amount matches the held soil amount. According to the seventh condition, the controller 26 changes the predetermined distance D1 from the actual topography 50 to the intermediate design topography 70 in response to the held soil amount. The stacking thickness of the piled soil can thereby be modified in response to the held soil amount. As a result, the soil remaining on the blade 18 can be reduced without using the piled soil.

(8) The eighth condition is that the pitch angle of the intermediate design topography 70 is less than the second upper limit angle θup2. According to the eighth condition, the maximum stacked thickness can be suppressed to be equal to or less than D2 as illustrated in FIG. 4.

When the actual topography is steep due to the pitch angle of the intermediate design topography 70 being reduced more than the second upper limit angle θup2, the intermediate design surface 70 is determined so as to scrape away the top of the slope as illustrated in FIG. 4.

(9) The ninth condition is that the pitch angle of the intermediate design topography 70 is greater than the second lower limit angle θlow2. Even if the pitch angle is lowered according to the eighth condition, excessive scraping away of the actual topography 50 is suppressed due to the ninth condition.

As explained above, the work implement 13 is automatically controlled by the control system 3 of the work vehicle 1 according to the present embodiment so that the blade tip of the work implement 13 moves to a position in between the actual topography 50 and the final design topography 60 and higher than the actual topography 50 by the predetermined distance D1. At this time, the blade tip of the work implement 13 is moved to a position below the final design topography 60 whereby the soil can be piled thinly on the actual topography 50 in comparison to a case of moving the work implement 13 along the final design topography 60.

Therefore, the soil can be piled in thin layers over the actual topography 50. As a result, the piled up soil can be easily compacted by the work vehicle 1. Accordingly, the quality of the finished work can be improved. Moreover, work efficiency can be improved.

Although the embodiment of the present invention has been described so far, the present invention is not limited to the above embodiment and various modifications may be made within the scope of the invention.

The work vehicle is not limited to a bulldozer, and may be another type of work vehicle such as a wheel loader or the like.

Figure 16:
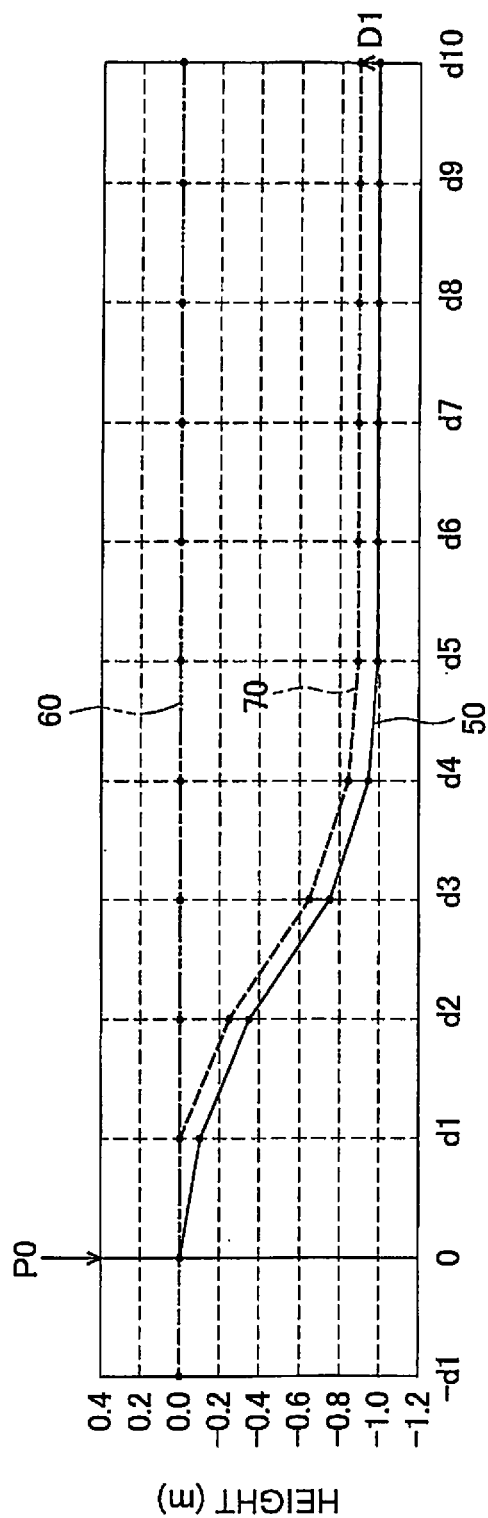
FIG. 16 illustrates an intermediate design topography according to a first modified example.

The processing for determining the intermediate design topography is not limited to the processing described above and may be modified. For example, a portion of the aforementioned first to ninth conditions may be modified or omitted. Alternatively, a different condition may be added to the first to ninth conditions. For example, FIG. 16 illustrates an intermediate design topography 70 according to a first modified example. As illustrated in FIG. 16, a layered intermediate design topography 70 may be generated that follows the actual topography 50.

Figure 17:
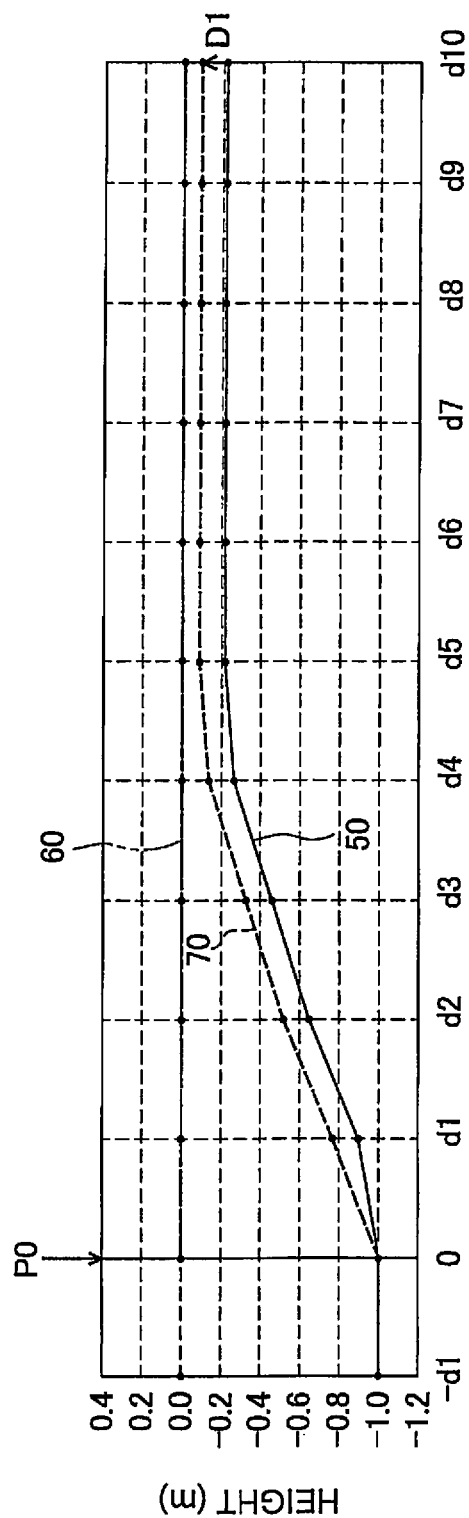
FIG. 17 illustrates an intermediate design topography according to a second modified example.

In the above embodiment, the actual topography 50 is inclined so as to drop downward in the forward direction from the reference position P0. However, the actual topography 50 may be inclined so as to rise up in the forward direction from the reference position P0. For example, FIG. 17 illustrates an intermediate design topography 70 according to a second modified example. As illustrated in FIG. 17, the actual topography 50 may be inclined so as to rise up in the forward direction from the reference position P0. In this case as well, the controller may determine the intermediate design topography 70 to be positioned above the actual topography 50 and below the final design topography 60 as illustrated in FIG. 17. As a result, the work implement 13 is automatically controlled so that the blade tip of the work implement 13 moves to a position in between the actual topography 50 and the final design topography 60 and higher than the actual topography 50 by the predetermined distance D1.

Figure 18:
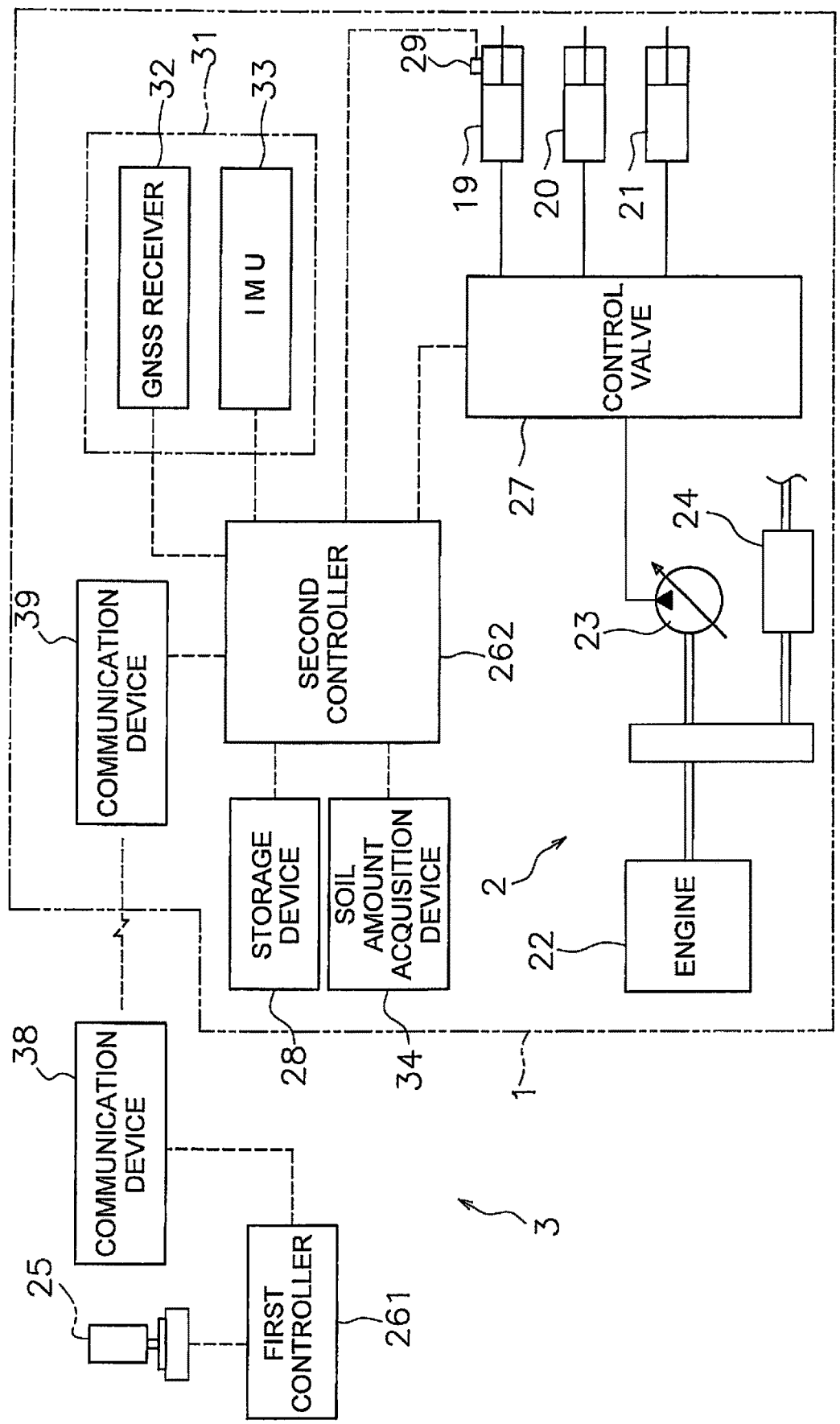
FIG. 18 is a block diagram of a control system according to another embodiment.

The controller may have a plurality of controllers separated from each other. For example as illustrated in FIG. 18, the controller may include a first controller (remote controller) 261 disposed outside of the work vehicle 1 and a second controller (on-board controller) 262 mounted on the work vehicle 1. The first controller 261 and the second controller 262 may be able to communicate wirelessly via communication devices 38 and 39. A portion of the abovementioned functions of the controller 26 may be executed by the first controller 261, and the remaining functions may be executed by the second controller 262. For example, the processing for determining virtual design surfaces 70 may be performed by the remote controller 261. That is, the processing from steps S101 to S105 illustrated in FIG. 5 may be performed by the first controller 261. Additionally, the processing (step S106) to output the command signals to the work implement 13 may be performed by the second controller 262.

The work vehicle may be remotely operated. In this case, a portion of the control system may be disposed outside of the work vehicle. For example, the controller may be disposed outside the work vehicle 1. The controller may be disposed inside a control center separated from the work site. The operating devices may also be disposed outside of the work vehicle. In this case, the operating cabin may be omitted from the work vehicle. Alternatively, the operating devices may be omitted. The work vehicle may be operated with only the automatic control by the controller without operations using the operating devices.

Figure 19:
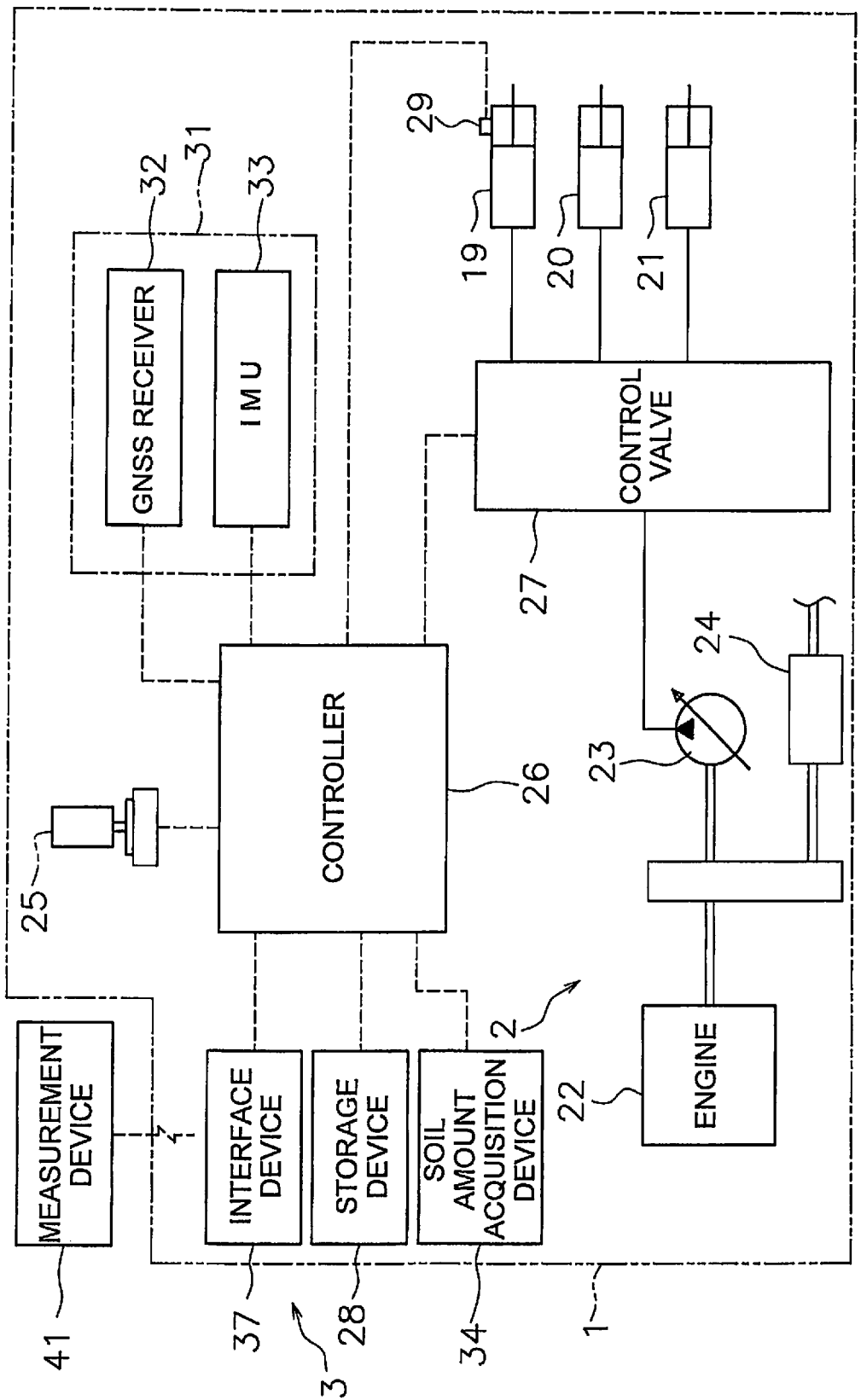
FIG. 19 is a block diagram of a control system according to another embodiment.
Figure 20:
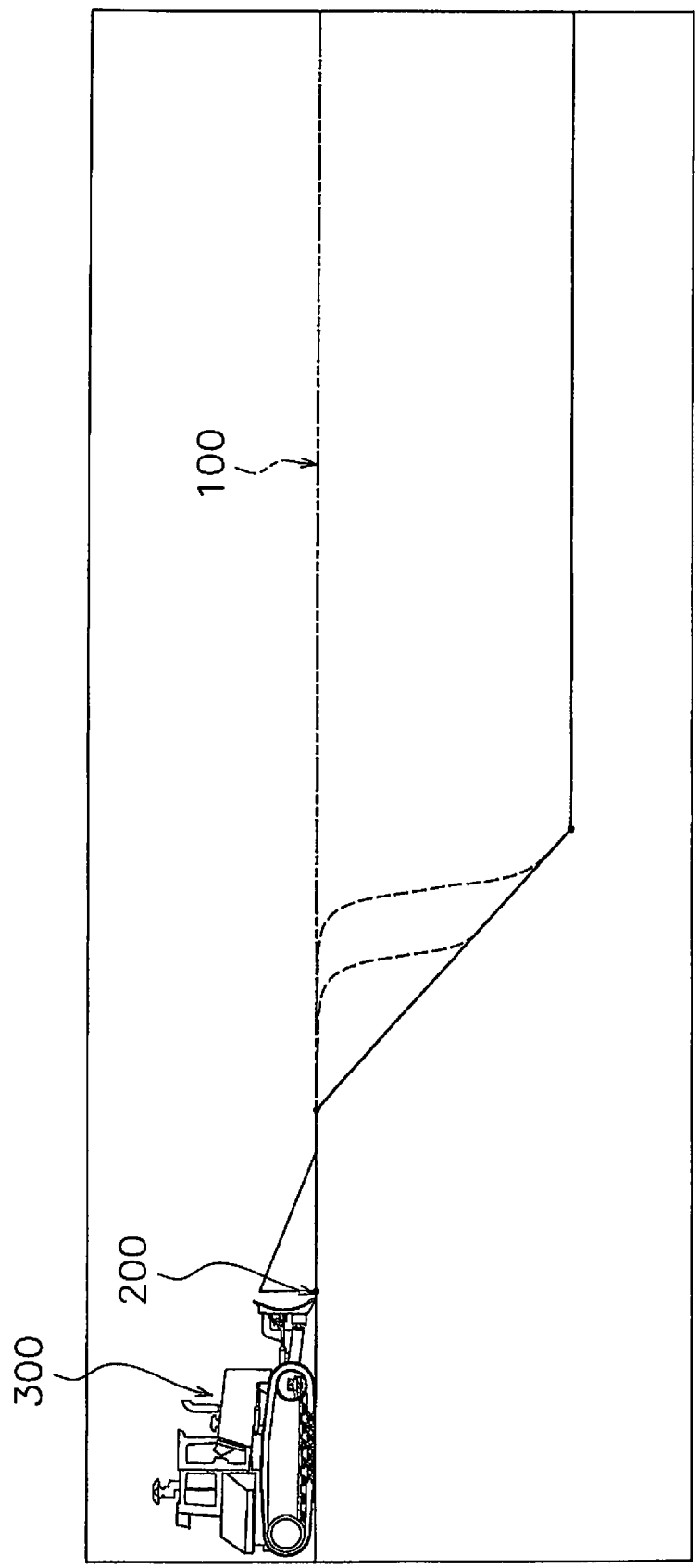
FIG. 20 illustrates conventional filling work.

The actual topography acquisition device is not limited to the abovementioned position detection device 31 and may be another device. For example, as illustrated in FIG. 19, the actual topography acquisition device may be an interface device 37 that receives information from external devices. The interface device 37 may wirelessly receive actual topography information measured by an external measurement device 41. Alternatively, the interface device 37 may be a recording medium reading device and may receive the actual topography information measured by the external measurement device 41 via a recording medium.

According to the present invention, there are provided a control system for a work vehicle, a control method, and a work vehicle that enable filling work that is efficient and exhibits a quality finish using automatic controls.

What is claimed is:

1. A control system for a work vehicle having a work implement, the control system comprising:
   an actual topography acquisition device that acquires actual topography information, which indicates an actual topography of a work target;
   a storage device that stores design topography information, which indicates a final design topography that is a target topography of the work target; and
   a controller configured to
      acquire the actual topography information from the actual topography acquisition device,
      acquire the design topography information from the storage device,
      generate a command signal to move the work implement to a position
         between the actual topography and the final design topography and
         above the actual topography by a predetermined distance, and
      change the predetermined distance in response to a shape of the actual topography.

2. The control system for a work vehicle according to claim 1, further comprising:
   a soil amount acquisition device that generates a soil amount signal, which indicates a held soil amount of the work implement,
   the controller being further configured to acquire the soil amount signal from the soil amount acquisition device and to change the predetermined distance in response to the held soil amount.

3. The control system for a work vehicle according to claim 1, wherein
   the controller is further configured to generate a command signal to move the work implement so that the work implement does not rise above the final design topography.

4. The control system for a work vehicle according to claim 1, wherein
   the controller includes
      a first controller disposed outside of the work vehicle, and
      a second controller that communicates with the first controller and is disposed inside the work vehicle,
   the first controller is configured to
      acquire the actual topography information from the actual topography acquisition device, and
      acquire the design topography information from the storage device, and the second controller is configured to generate the command signal to move the work implement.

5. A control system for a work vehicle having a work implement, the control system comprising:
an actual topography acquisition device that acquires actual topography information, which indicates an actual topography of a work target;
a storage device that stores design topography information, which indicates a final design topography that is a target shape of the work target; and
a controller configured to
acquire the actual topography information from the actual topography acquisition device,
acquire the design topography information from the storage device,
determine an intermediate design topography positioned above the actual topography and below the final design topography based on the actual topography information and the design topography information, and
generate a command signal to move the work implement based on the intermediate design topography.

6. The control system for a work vehicle according to claim 5, wherein
the controller is further configured to set the intermediate design topography to a position higher than the actual topography by a predetermined distance.

7. The control system for a work vehicle according to claim 6, wherein
the controller is further configured to change the predetermined distance in response to a shape of the actual topography.

8. The control system for a work vehicle according to claim 6, further comprising:
a soil amount acquisition device that generates a soil amount signal, which indicates a held soil amount of the work implement,
the controller being further configured to acquire the soil amount signal from the soil amount acquisition device and to change the predetermined distance in response to the held soil amount.

9. The control system for a work vehicle according to claim 5, wherein
the controller is further configured to
update the actual topography with the actual topography information from the actual topography acquisition device, and
determine a next intermediate design topography based on the updated actual topography.

10. The control system for a work vehicle according to claim 5, wherein
the controller is further configured to determine the intermediate design topography so as not to rise above the final design topography.

11. A control method for a work vehicle having a work implement, the control method comprising:
acquiring actual topography information, which indicates an actual topography of a work target;
acquiring design topography information, which indicates a final design topography that is a target topography of the work target;
determining an intermediate design topography positioned above the actual topography and below the final design topography based on the actual topography information and the design topography information; and
generating a command signal to move the work implement based on the intermediate design topography.

12. The control method for a work vehicle according to claim 11, wherein:
a command signal is generated to move the work implement so that the work implement does not rise above the final design topography.

13. The control method for a work vehicle according to claim 11, further comprising
setting the intermediate design topography to a position higher than the actual topography by a predetermined distance.

14. The control method for a work vehicle according to claim 13, wherein
the predetermined distance is changed in response to a shape of the actual topography.

15. The control method for a work vehicle according to claim 13, further comprising:
acquiring a soil amount signal, which indicates a held soil amount of the work implement,
the predetermined distance being changed in response to the held soil amount.

16. A work vehicle comprising:
a work implement; and
a controller configured to
acquire actual topography information, which indicates an actual topography of a work target;
acquire design topography information, which indicates a final design topography that is a target topography of the work target;
determine an intermediate design topography positioned above the actual topography and below the final design topography based on the actual topography information and the design topography information; and
control the work implement to move based on the intermediate design topography.

17. The work vehicle according to claim 16, wherein
the controller is further configured to generate a command signal to move the work implement so that the work implement does not rise above the final design topography.

18. The work vehicle according to claim 16, wherein
the controller is further configured to set the intermediate design topography to a position higher than the actual topography by a predetermined distance.

19. The work vehicle according to claim 18, wherein
the controller is further configured to change the predetermined distance in response to a shape of the actual topography.

20. The work vehicle according to claim 18, further comprising:
a soil amount acquisition device that generates a soil amount signal, which indicates a held soil amount of the work implement,
the controller being further configured to acquire the soil amount signal from the soil amount acquisition device and to change the predetermined distance in response to the held soil amount.

* * * * *